United States Patent
Marega

(10) Patent No.: US 11,719,030 B2
(45) Date of Patent: Aug. 8, 2023

(54) FASTENING ARRANGEMENT FOR VEHICLE SLIDING DOOR

(71) Applicant: Ningbo Geely Automobile Research & Development Co., Ltd., Ningbo (CN)

(72) Inventor: Luca Marega, Lilla Edet (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 62 days.

(21) Appl. No.: 17/207,648

(22) Filed: Mar. 20, 2021

(65) Prior Publication Data

US 2021/0207415 A1     Jul. 8, 2021

Related U.S. Application Data

(63) Continuation of application No. PCT/CN2019/111824, filed on Oct. 18, 2019.

(30) Foreign Application Priority Data

Oct. 23, 2018    (EP) ..................................... 8202098

(51) Int. Cl.
     *E05D 15/06*        (2006.01)
     *E05F 15/655*      (2015.01)
     (Continued)

(52) U.S. Cl.
     CPC ........ *E05D 15/0686* (2013.01); *B60J 5/0468* (2013.01); *B60J 5/06* (2013.01);
     (Continued)

(58) Field of Classification Search
     CPC ............ E05D 15/0686; E05D 15/0665; E05D 15/0678; E05D 15/0682; E05D 15/066; E05D 15/1047; B60J 5/06
     See application file for complete search history.

(56) References Cited

U.S. PATENT DOCUMENTS 5,895,089 A * 4/1999 Singh ........................ B60J 5/06
                                                          49/213
6,036,257 A * 3/2000 Manuel ............... E05D 15/1081
                                                          49/213

(Continued)

FOREIGN PATENT DOCUMENTS

| CN | 101457616 A | 6/2009 |
| CN | 102762810 A | 10/2012 |

(Continued)

OTHER PUBLICATIONS

International Search Report from corresponding International Application No. PCT/CN2019/111824, dated Jan. 16, 2020, 2 pages.

*Primary Examiner* — Marcus Menezes
(74) *Attorney, Agent, or Firm* — Tucker Ellis LLP

(57) ABSTRACT

A fastening arrangement for fastening a vehicle sliding door to a vehicle body while enabling opening and closing of the sliding door. The fastening arrangement includes a motion element configured for being movingly arranged within or on a vehicle body guiding rail for enabling movement of the motion element along the vehicle body guiding rail, and a variable-length motion mechanism connected to the motion element and configured for being fastened to the sliding door at a lower attachment area of the sliding door. The variable-length motion mechanism is configured for enabling variable distance between the motion element and the lower attachment area of the sliding door.

15 Claims, 11 Drawing Sheets

(51) Int. Cl.
*B60J 5/04* (2006.01)
*B60J 5/06* (2006.01)
*E05D 15/10* (2006.01)

(52) U.S. Cl.
CPC ....... *E05D 15/0665* (2013.01); *E05D 15/101* (2013.01); *E05F 15/655* (2015.01); *E05Y 2201/434* (2013.01); *E05Y 2201/624* (2013.01); *E05Y 2201/684* (2013.01); *E05Y 2201/716* (2013.01); *E05Y 2201/722* (2013.01); *E05Y 2900/531* (2013.01)

(56) References Cited

U.S. PATENT DOCUMENTS

| | | | | |
|---|---|---|---|---|
| 7,243,461 | B2* | 7/2007 | Rogers, Jr. | E05B 83/40 49/360 |
| 7,611,190 | B1* | 11/2009 | Elliott | B60J 5/06 49/248 |
| 8,353,555 | B2* | 1/2013 | Boettcher | E05D 15/1047 296/146.12 |
| 8,464,469 | B2* | 6/2013 | Oberheide | E05F 15/646 49/360 |
| 8,713,852 | B2* | 5/2014 | Choi | E05F 11/48 49/218 |
| 9,587,724 | B2* | 3/2017 | Choi | E05D 15/58 |
| 9,752,366 | B2* | 9/2017 | Pellegrini | E05F 15/00 |
| 9,777,811 | B2* | 10/2017 | Choi | E05D 15/101 |
| 10,914,108 | B2* | 2/2021 | Yun | B60J 5/06 |
| 11,313,163 | B2* | 4/2022 | Yun | E05D 15/30 |
| 2003/0116995 | A1* | 6/2003 | Yogo | E05D 15/1047 296/155 |
| 2010/0095595 | A1 | 4/2010 | Hanaki et al. | |
| 2015/0291014 | A1* | 10/2015 | Choi | E05D 15/101 49/449 |
| 2016/0130844 | A1* | 5/2016 | Choi | B60J 5/06 49/449 |
| 2016/0272053 | A1* | 9/2016 | Maruyama | E05D 13/04 |
| 2016/0298372 | A1* | 10/2016 | Seto | B60J 5/062 |
| 2018/0119465 | A1* | 5/2018 | Wojdyla | E05D 15/30 |
| 2020/0149331 | A1* | 5/2020 | Kiryu | E05F 1/16 |
| 2020/0181968 | A1* | 6/2020 | Suzuki | E05F 15/643 |
| 2020/0240186 | A1* | 7/2020 | Kuroiwa | E05D 15/1047 |
| 2021/0172227 | A1* | 6/2021 | Yun | E05D 15/30 |

FOREIGN PATENT DOCUMENTS

| | | | | |
|---|---|---|---|---|
| CN | 105569466 | A | 5/2016 | |
| CN | 105584331 | A | 5/2016 | |
| DE | 202007004205 | U1 | 7/2007 | |
| DE | 102015216094 | A1 | 5/2016 | |
| EP | 1997997 | A2 | 12/2008 | |
| EP | 3070240 | A1 * | 9/2016 | ............. B60J 5/047 |
| EP | 3667006 | A1 * | 6/2020 | ............ B60J 5/0477 |
| JP | 2009114773 | A | 5/2009 | |
| KR | 200473915 | Y1 | 8/2014 | |
| WO | 89/05894 | A1 | 6/1989 | |
| WO | WO-8905894 | A1 * | 6/1989 | |
| WO | 2015044357 | A1 | 4/2015 | |

* cited by examiner

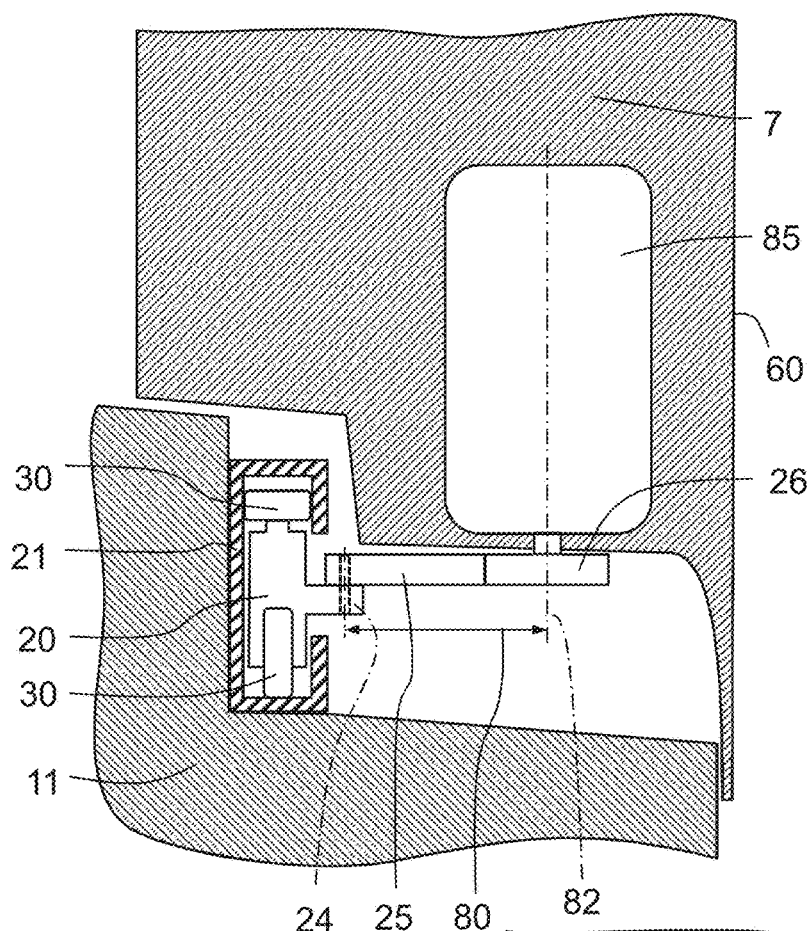
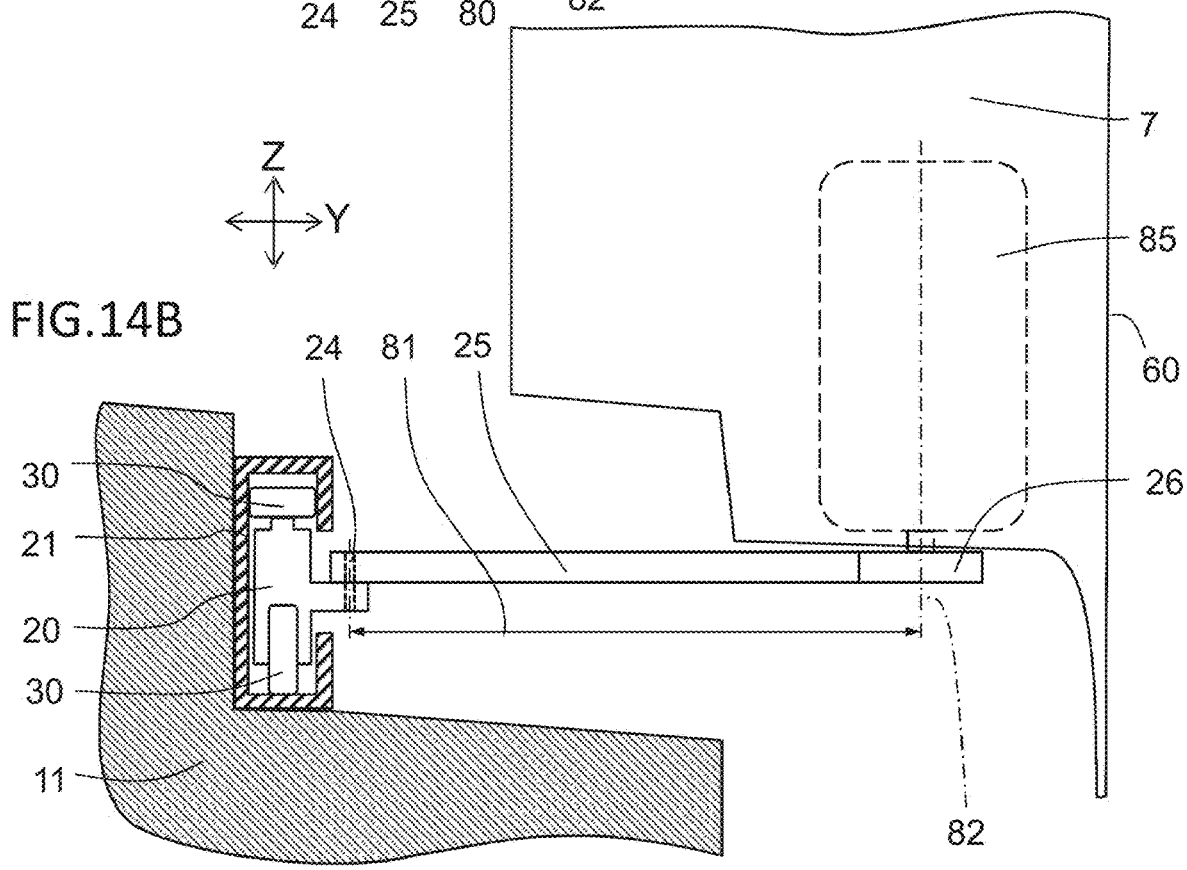
FIG.14A
FIG.14B

FASTENING ARRANGEMENT FOR VEHICLE SLIDING DOOR

RELATED APPLICATION DATA

This application is a continuation of International Patent Application No. PCT/CN2019/111824, filed Oct. 18, 2019, which claims the benefit of European Patent Application No. 18202098.2, filed Oct. 23, 2018, the disclosures of which are incorporated herein by reference in their entireties.

TECHNICAL FIELD

The disclosure relates to a fastening arrangement for fastening a vehicle sliding door to a vehicle body while enabling opening and closing of the sliding door. The disclosure also relates to a vehicle having such a fastening arrangement, and a method for opening a sliding door of a vehicle having a vehicle body and a fastening arrangement for fastening the sliding door to the vehicle body while enabling opening and closing of the sliding door.

Although the disclosure will be described in relation to a car, the disclosure is not restricted to this particular type of vehicle, but may alternatively be installed in other types of vehicles such as minivans, recreational vehicles, off-road vehicles, trucks, buses, marine vehicles, air vehicles, or the like.

BACKGROUND

Doors for enabling access to vehicle can be opened and closed in a variety of ways, such as for example by means of a pivotal or sliding opening and closing motion. Sliding doors does not extend much laterally beyond the lateral side surface of the vehicle in opened position making sliding doors an attractive design solution. Sliding door also enables a relatively large opening for simplified entering or leaving the vehicle.

SUMMARY

This section provides a general summary of the disclosure, and is not a comprehensive disclosure of its full scope or all of its features.

A sliding door moving from a closed position to an open position typically undergo two motion sequences: A first motion sequence in which the sliding door is displaced simultaneously both laterally outwardly and longitudinally along a length direction of the vehicle body, from a closed position to an intermediate position, and subsequently a second motion sequence in which the sliding door is displaced substantially longitudinally along a length direction of the vehicle body, from the intermediate position to an open position of the sliding door. The closing of the sliding door involves the same motion sequences but performed in reversed order and direction.

Sliding doors are generally attached to guiding rails of the vehicle body via a plurality of solid and non-adjustable brackets, wherein at least the lower guiding rail located at the rocker of the vehicle body is generally bent inwardly towards a centre line of the vehicle in the area where the bracket is located in a closed position of the sliding door for enabling the sliding door to move laterally inwardly in the region of the closed position of the sliding door.

Consequently, a problem with currently available fastening arrangements for sliding doors is that they generally require a large space within the vehicle body in the area of said fastening arrangements due to the inwardly curved design of the guiding rail. This is particularly problematic for electrical of hybrid electric vehicle where the floor region of the vehicle often is used for storing the propulsion battery making inwardly curved guiding rails undesirable, and/or vehicles having straight rockers made of extruded aluminium beams, such that mounting of inwardly curved guiding rails would require additional costly manufacturing processing of the straight extruded beams, as well as weakening the strength of said straight beams, because an inwardly curved guiding rail would require material removing machining of the straight extruded aluminium profile for creating space for the inwardly curved guide rail.

An object of the present disclosure is consequently to provide a fastening system for a sliding door of a vehicle that enables opening or closing of the sliding door while avoiding inwardly curved guiding rails, at least for the guiding rail located at the rocker of the vehicle.

The objective is at least partly achieved by a fastening arrangement and method as defined in the accompanying independent claims.

In particular, according to a first aspect of the present disclosure, the objective is at least partly achieved by a fastening arrangement for fastening a vehicle sliding door to a vehicle body while enabling opening and closing of the sliding door, wherein the fastening arrangement comprises a motion element configured for being movingly arranged within or on a vehicle body guiding rail for enabling movement of the motion element along the vehicle body guiding rail, wherein the fastening arrangement further comprises a variable-length motion mechanism connected to the motion element and configured for being fastened to the sliding door at a lower attachment area of the sliding door, and wherein the variable-length motion mechanism is configured for enabling variable distance between the motion element and the lower attachment area of the sliding door.

Moreover, according to a second aspect of the present disclosure, the objective is also at least partly achieved by method for opening a sliding door of a vehicle having a vehicle body and a fastening arrangement for fastening the sliding door to the vehicle body while enabling opening and closing of the sliding door, wherein the fastening arrangement comprises a motion element movingly arranged within or on a vehicle body guiding rail for enabling movement of the motion element along the vehicle body guiding rail, and a variable-length motion mechanism connected to the motion element and fastened to the sliding door at a lower attachment area of the sliding door, wherein the method comprises performing a first motion sequence involving extension of the variable-length motion mechanism from a contracted state to an extended state, thereby causing the sliding door to displace from a closed position to an intermediate position while the motion element remains substantially stationary, and subsequently performing a second motion sequence involving displacing the motion element along the vehicle body guiding rail, thereby causing the sliding door to displace primarily in a longitudinal direction of the vehicle body from the intermediate position to an open position of the sliding door while the variable-length motion mechanism remains in the extended state.

In this way, it becomes possible to have a substantially straight and linear vehicle body guiding rail, because the required lateral inwards motion of the sliding door configured to take place upon approaching the closed position of the sliding door is provided by the variable-length motion mechanism being adjusted from the extended state to the contracted state.

In other words, the opening and closing motion of the sliding door as such remains substantially the same while the guiding rail may have a substantially linear shape instead of an inwardly curved shape, thereby avoiding intruding into the space intended for propulsion battery storage, and avoiding additional manufacturing processing of an extruded straight aluminium rocker if such is used as rocker beam of the vehicle body.

Further advantages are achieved by implementing one or several of the features of the dependent claims.

In some example embodiments, the variable-length motion mechanism is configured for providing a first distance between the motion element and the lower attachment area of the sliding door in a closed position of the sliding door and a second distance between the motion element and the lower attachment area of the sliding door in an open position of the sliding door, wherein the second distance is larger than the first distance. Thereby the necessary lateral motion of the sliding door is accomplished without need for a curved guide rail, such that straight guide rail can be used.

In some example embodiments, the variable-length motion mechanism includes an arm and a travel element, wherein the arm is pivotally connected to the motion element, wherein the travel element is secured to, and can travel along the length of, the arm, and wherein the travel element is configured for being fastened to the sliding door at the lower attachment area of the sliding door for enabling variable distance between the motion element and the lower attachment area of the sliding door. Thereby, a relatively low-cost but still robust and effective variable distance mounting of the lower side of the door to the vehicle is provided.

In some example embodiments, the variable-length motion mechanism includes a mechanical spring having a first end and a second end, wherein the first end is connected to the motion element or an end region of the arm being connected to the motion element, and the second end is connected to the travel element. Thereby, closing of the sliding door is simplified, since the mechanical spring becomes tensioned upon opening the door and subsequently more relaxed again upon closing the door.

In some example embodiments, the variable-length motion mechanism is a variable-length motion actuator configured for enabling powered variable distance between the motion element and the lower attachment area of the sliding door. Thereby, even further improved user-friendliness is accomplished.

In some example embodiments, the variable-length motion actuator is a rack-and-pinion actuator. This provides a robust, cost-efficient and compact actuator solution.

In some example embodiments, a first end of the rack is pivotally connected to the motion element and the pinion is drivingly connected to a motor and configured for being secured to the sliding door. Thereby a robust and compact assembly of the fastening arrangement is accomplished.

In some example embodiments, the pinion is rotationally fastened on an output shaft of the motor. This results in reduced cost and improves reliability because there is no need for an external reduction gearbox.

In some example embodiments, the rack-and-pinion actuator has a counter-pressure arrangement for forcing driving engagement members of the pinion into driving engagement with corresponding driving engagement members of the rack. Thereby the operating reliability of the rack-and-pinion actuator is improved.

In some example embodiments, the rack-and-pinion actuator has a locking arrangement providing selective locking of the rack-and-pinion actuator at a certain relative position of the rack and pinion, in particular at an extended state of the rack-and-pinion actuator. This may be relevant for ensuring that the motion element is located in the desired position upon reaching the intermediate position of the sliding door during closing of the sliding door.

In some example embodiments, the fastening arrangement further comprises a vehicle body guiding rail that has a substantially linear guide path enabling a substantially linear movement of the motion element along the vehicle body guiding rail. The linear and straight guide rail enables improved space for propulsion battery storage in the floor of the vehicle, and/or the use of straight extruded aluminium rockers without additional manufacturing processing.

In some example embodiments, the motion element comprises a carriage having at least two rollers for rolling engagement with the vehicle body guide rail and an attachment arrangement for pivotal connection with the variable-length motion mechanism. The pivotal connection enables improved contraction and extension motion of the variable-length motion mechanism.

The disclosure also relates to a vehicle having a vehicle body and a sliding door, and a fastening arrangement as described above, wherein the motion element is movingly arranged within or on the vehicle body guiding rail for enabling movement of the motion element along the vehicle body guiding rail, wherein the variable-length motion mechanism is fastened to the sliding door at a lower attachment area of the sliding door, and wherein the variable-length motion mechanism enables variable distance between the motion element and the lower attachment area of the sliding door.

In some example embodiments, the variable-length motion mechanism is a variable-length motion actuator configured for enabling powered variable distance between the motion element and the lower attachment area of the sliding door, and wherein the variable-length motion actuator is a rack-and-pinion actuator.

In some example embodiments, the pinion is drivingly connected to a motor, and the motor is located within the sliding door. This provides a compact and robust design of the variable-length motion actuator.

In some example embodiments, the rack has an outwardly curved shape, as seen from a top view facing downwards on the vehicle and with the sliding door in a closed position, such that a closing force vector generated by interaction of the pinion and rack, acting on the sliding door at the lower attachment area of the sliding door in a closed position of the sliding door, has a component that is directed inwards towards the vehicle body. This provides improved closure of the sliding door.

In some example embodiments, the fastening arrangement further comprises an upper fastening arrangement providing sliding connection of the sliding door to the vehicle body between an open and a closed position of the sliding door, wherein the upper fastening arrangement includes a vehicle body upper guide rail located adjacent a vehicle body roof or roof rail and having a straight rail section and an inwardly curved rail section, an upper motion element movingly arranged within or on the vehicle body upper guiding rail, and a solid bracket connecting an upper attachment area of the sliding door to the upper motion element, wherein at a closed position of the sliding door the variable-length motion mechanism is in a contracted state and the upper motion element is located at an inner end region of the curved rail section, and wherein at an intermediate position of the sliding door the variable-length motion mechanism is in an extended state and the upper motion element is located in an outer end region of the curved rail section. The upper fastening arrangement in form of an inwardly curved guide rail ensures proper motion of the sliding door during opening and closing of the sliding door.

In some example embodiments, the sliding door is configured for performing a first motion sequence and subsequently a second motion sequence upon moving from a closed position to an open position of the sliding door, wherein the first motion sequence involves extending the variable-length motion mechanism from a contracted state to an extended state, thereby causing the sliding door to displace from a closed position to an intermediate position while the motion element remains stationary, and the second motion sequence involves displacing the motion element along the vehicle body guiding rail, thereby causing the sliding door to displace primarily in a longitudinal direction of the vehicle body from the intermediate position to an open position of the sliding door while the variable-length motion mechanism remains in the extended state. These two motion sequences provide the desired motion of the sliding door while enabling use of straight and linear guide rails.

In some example embodiments, the variable-length motion mechanism is a variable-length motion actuator, and the method step of performing the first motion sequence involves powered extension of the variable-length motion actuator from the contracted state to the extended state.

Further features of, and advantages with, the present disclosure will become apparent when studying the following description. The skilled person realizes that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which:

FIGS. 14A and 14B show a cross-section in a vertical plane of the fastening arrangement in two different positions of the sliding door;

DETAILED DESCRIPTION

Figure 1:
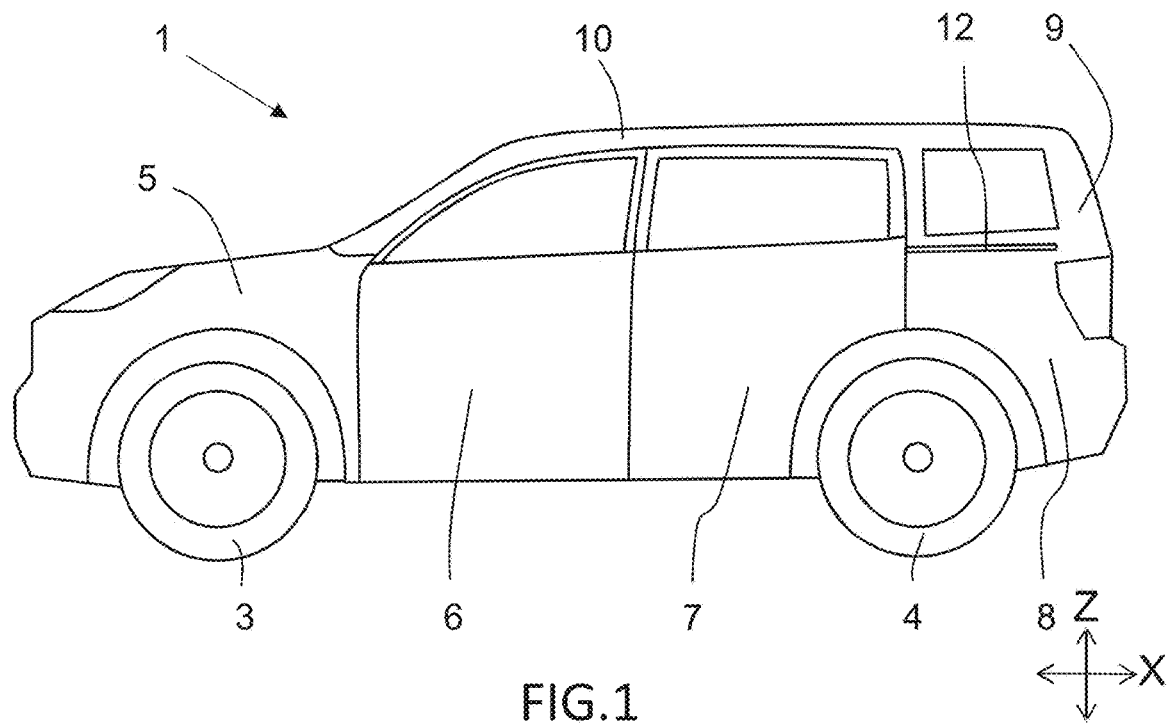
FIG. 1 is a side view of a vehicle having a sliding door in a closed position.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Figure 2:
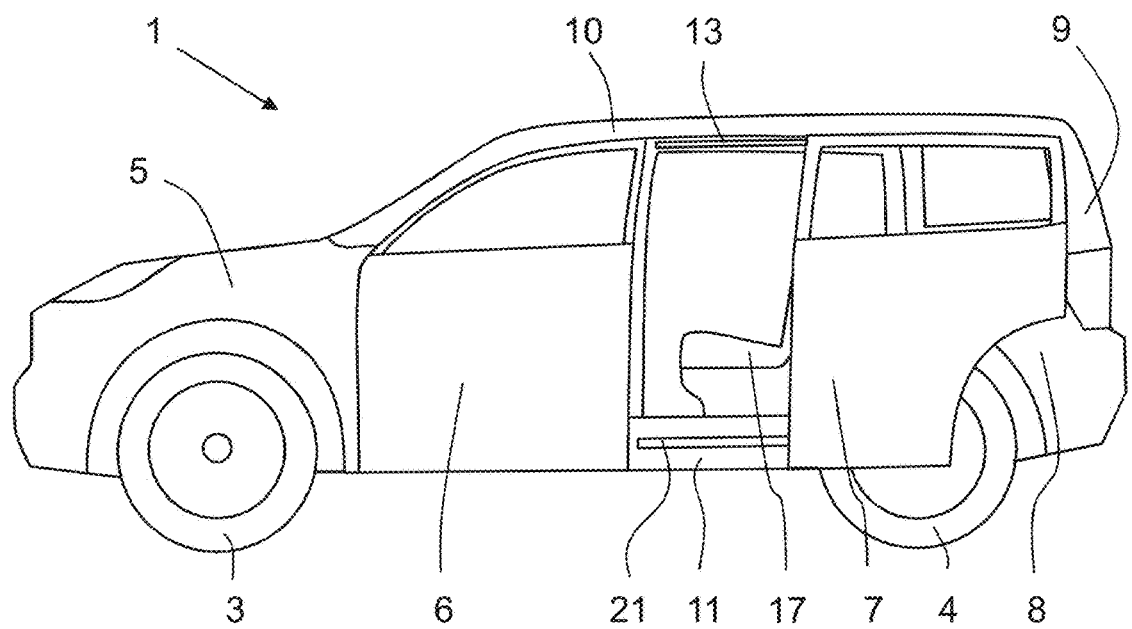
FIG. 2 is the same side view as FIG. 1 but with the sliding door in an open position.

Referring now to FIGS. 1 and 2, there is depicted a side view of an example vehicle 1 in form of a car having front wheel 3, rear wheel 4, front side panel 5, front door 6, rear door 7, a rear seat 17, rear quarter panel 8, a trunk door 9 and a roof 10 secured to two spaced-apart longitudinally extending roof rails. The vehicle has a horizontal longitudinal extension (straight driving direction) along an X-axis, a vertical extension along a Z-axis, and horizontal lateral extension along a Y-axis, which is perpendicular to the X-axis and Z-axis.

In the example embodiment of FIGS. 1 and 2, the rear door 7 is configured to be a sliding door 7, wherein FIG. 1 shows the sliding door 2 in a closed position and FIG. 2 shows the sliding door 2 in an open position. However, the disclosure is not restricted to this specific type of vehicle. For example, the vehicle may alternatively on at least one side of the vehicle have two sliding doors opening in opposite directions and configured to jointly open and close an access opening of the vehicle 1.

The sliding door 7 of the example embodiment of FIGS. 1 and 2 is attached to the vehicle 1 by a fastening arrangement. The fastening arrangement fastens the vehicle sliding door 7 to a vehicle body while enabling opening and closing of the sliding door 7. The vehicle body generally refers to chassis of the vehicle onto which the various panels, doors, lids, etc. are attached.

In the example embodiment of FIGS. 1 and 2, the fastening arrangement for attaching the sliding door 7 to the vehicle body comprises three separate attachment arrangements that jointly cooperate for fastening the sliding door 7 to the vehicle 1 while allowing sliding opening and closing of the sliding door 7. Specifically, the fastening arrangement comprises a lower fastening arrangement located in the region of the floor and rocker 11 of the vehicle body, an upper fastening arrangement located in the region of the roof 10 and a central fastening arrangement located in the region of the rear quarter panel 8.

A guiding rail 12 of the central fastening arrangement is partly shown in FIG. 1, and an upper guiding rail 13 of the upper fastening arrangement and lower guiding rail 14 of the lower fastening arrangement are partly shown in FIG. 2.

Figure 3:
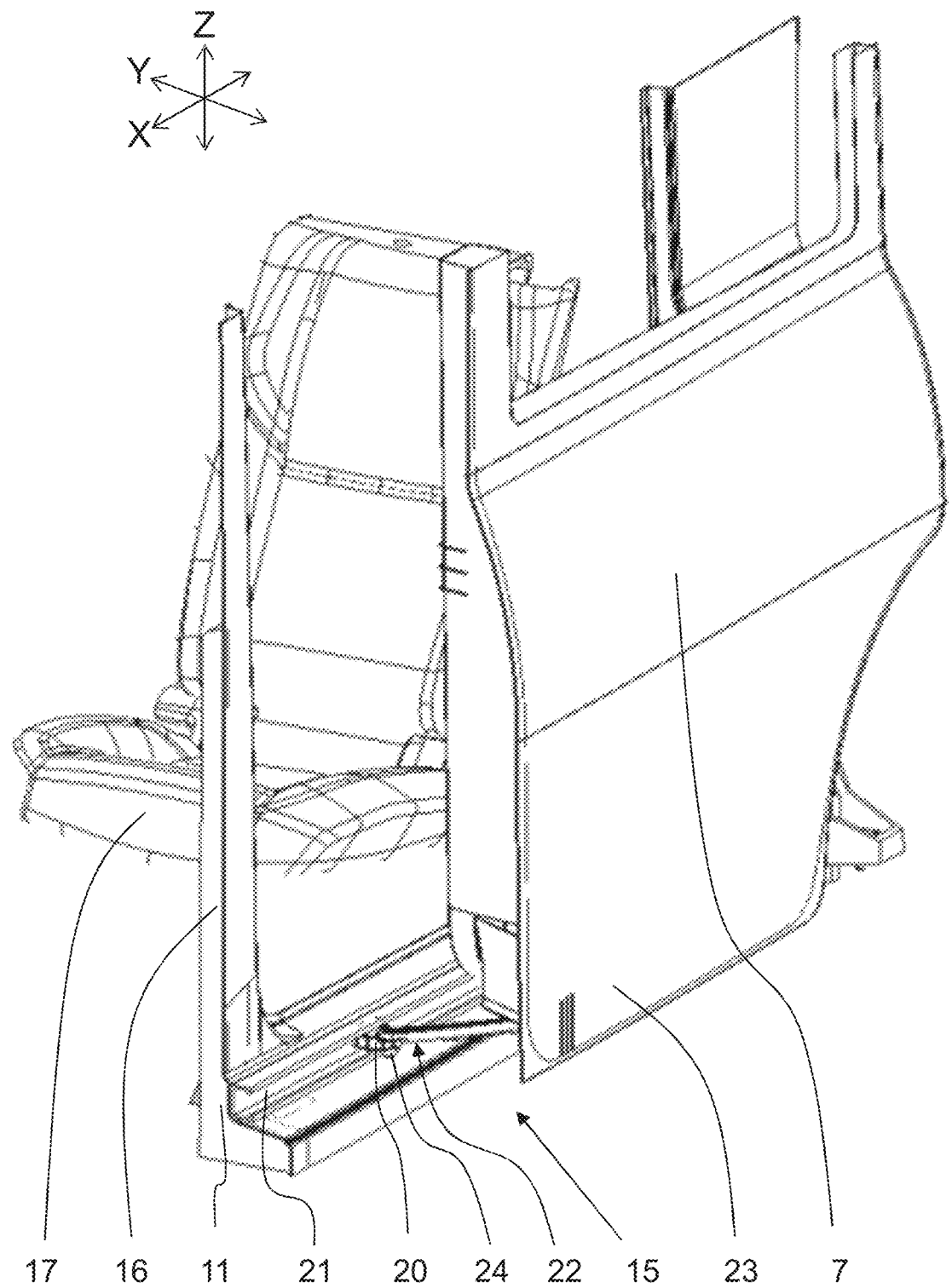
FIG. 3 is a perspective view of the sliding door in a half-open position.

FIG. 3 shows a perspective view of a lower portion of the sliding door 7, part of the vehicle body including the rocker 11 and part of a B-pillar 16, as well part of the lower fastening arrangement 15. The rear seat 17 of FIG. 2 is also shown in FIG. 3. The sliding door 7 is in a partly opened position in FIG. 3.

As schematically illustrated in FIG. 3, the lower fastening arrangement 15 may according to an example embodiment of the disclosure comprise a motion element 20 configured for being movingly arranged within or on a vehicle body guiding rail 21 for enabling movement of the motion element 20 along the vehicle body guiding rail 21, and a variable-length motion mechanism 22 connected to the motion element 20 and configured for being fastened to the sliding door 7 at a lower attachment area 23 of the sliding door 7. The variable-length motion mechanism 22 is configured for enabling variable distance between the motion element 20 and the lower attachment area 23 of the sliding door 7.

The variable-length motion mechanism 22 is in the example embodiment of FIG. 3 pivotally connected to the motion element 20 around a vertically extending pivoting axis at a connection point 24.

In some example embodiments, the variable-length motion mechanism 22 is a variable-length motion actuator 22. The variable-length motion actuator 22 is configured for enabling powered variable distance between said connection point 24 and the lower attachment area 23 of the sliding door 7. The powered variable distance of the variable-length motion actuator 22 is provided by a power source, such as for example an electric, pneumatic or hydraulic motor. Moreover, the variable distance may for example be providable also at still standing motion element.

The variable-length motion actuator 22 may for example have a linear displacement, meaning that the variable-length motion actuator 22 provides a variable distance along a linear path. Alternatively, the variable-length motion actuator 22 may have a curved displacement, or partly curved and partly linear displacement, meaning that the variable-length motion actuator 22 provides a variable distance along a curved path, or a partly curved and partly linear path.

Figure 4:
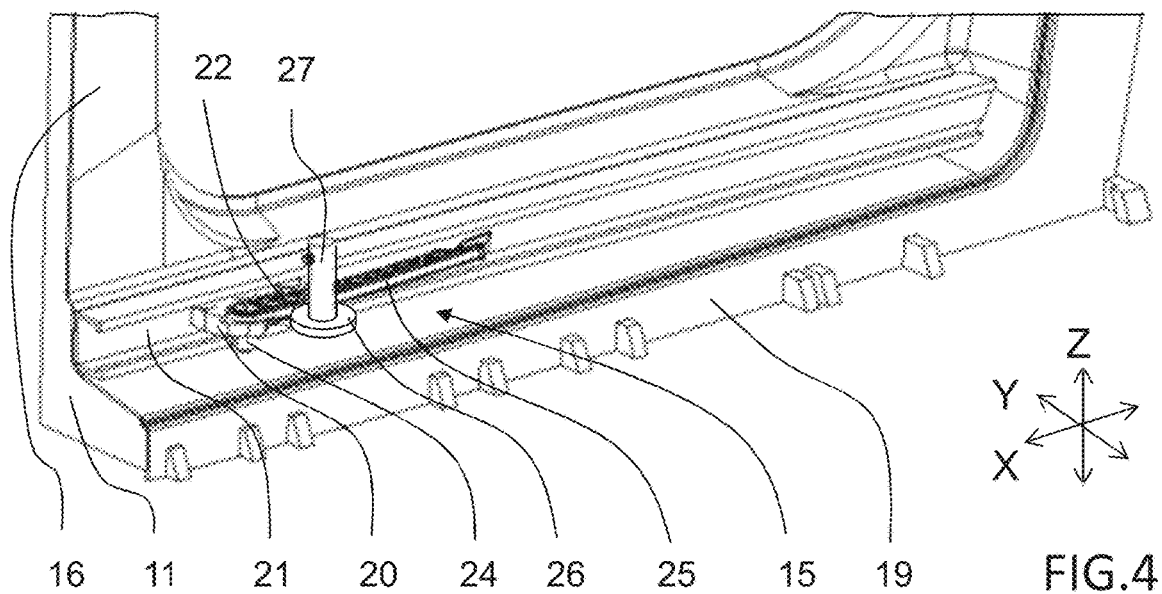
FIG. 4 show a perspective view of the fastening arrangement without the sliding door.

FIG. 4 shows a further perspective view of the lower fastening arrangement but here with the sliding door 7 being removed, for the purpose of better illustrating the components and mounting of the lower fastening arrangement 15 to the vehicle body. The motion element 20 is illustrated being a position corresponding to a partly opened position of the sliding door 7.

In the example embodiment of the lower fastening arrangement showed in FIG. 4, the variable-length motion actuator 22 is made of a rack-and-pinion actuator having a rack 25 with engagement members, such as engagement teeth, and a pinion 26 with corresponding engagement members, such as corresponding engagement teeth.

The pinion 26 may for example be rotationally fastened to a shaft 27 for rotation thereof, for example by having the shaft 27 directly and indirectly connected to an output shaft of the power source. Alternatively, the pinion 26 may be rotatably mounted on a stationary shaft 27 of the sliding door 7, and the pinion 26 is drivingly connected to a motor and configured for being secured to the sliding door 7.

FIG. 4 provides a clear view of the guiding rail 21 extending along the rocker 11 of the vehicle body. The vehicle body guiding rail 21 has according to the example embodiment of FIG. 4 a linear and straight guide path enabling a linear movement of the motion element 20 along the vehicle body guiding rail 21 and parallel with the longitudinal direction X of the vehicle. Specifically, the guide path of the vehicle body guiding rail 21 may according to some example embodiments, as illustrated in FIG. 4, be linear and straight over the entire length of the guiding rail 21.

However, the guide path of the vehicle body guiding rail 21 may alternatively be substantially linear and/or substantially parallel with the longitudinal direction X of the vehicle, wherein the term substantially linear and/or substantially parallel may include a guide path having an orientation that deviates up to 20 degrees, specifically up to 10 degrees, and more specifically up to 5 degrees between two spaced apart positions along the guide path in a horizontal plane, or wherein the term substantially linear and/or substantially parallel may include a guide path that deviates up to 10 cm, specifically up to 7 cm, and more specifically up to 4 cm from a lateral edge 19 of the rocker, between two spaced apart positions along the guide path of the guide rail 21.

Such relatively small deviation from an entirely linear and straight guiding path and/or a guide path that is entirely parallel with the longitudinal direction X may in certain implementations be deemed acceptable while still not intruding any significant into a storing space of the propulsion battery or while still enabling use of straight rockers made of extruded aluminium beams.

The vehicle body guiding rail 21 may be an individual separate part that is configured to be attached to the rocker 11 of the vehicle body. The attachment may for example be performed by welding the guiding rail 21 to the vehicle body, or by mechanical fasteners, such as rivets, threaded members, or the like.

Alternatively, the vehicle body guiding rail 21 may formed integrally with the rocker 11 of the vehicle body. An extruded aluminium rocker may for example easily be designed with an integrally formed external guiding rail 21 configured for guiding the motion element 20 along the guide rail 21.

If the vehicle body guiding rail 21 is an individual separate part that is configured to be attached to the rocker 11 of the vehicle body, an exterior laterally inwardly facing surface of the vehicle body guiding rail 21 configured for facing 11 the rocker may be substantially planar for enabling good support to the guiding rail 21 from the vehicle body.

Figure 5:
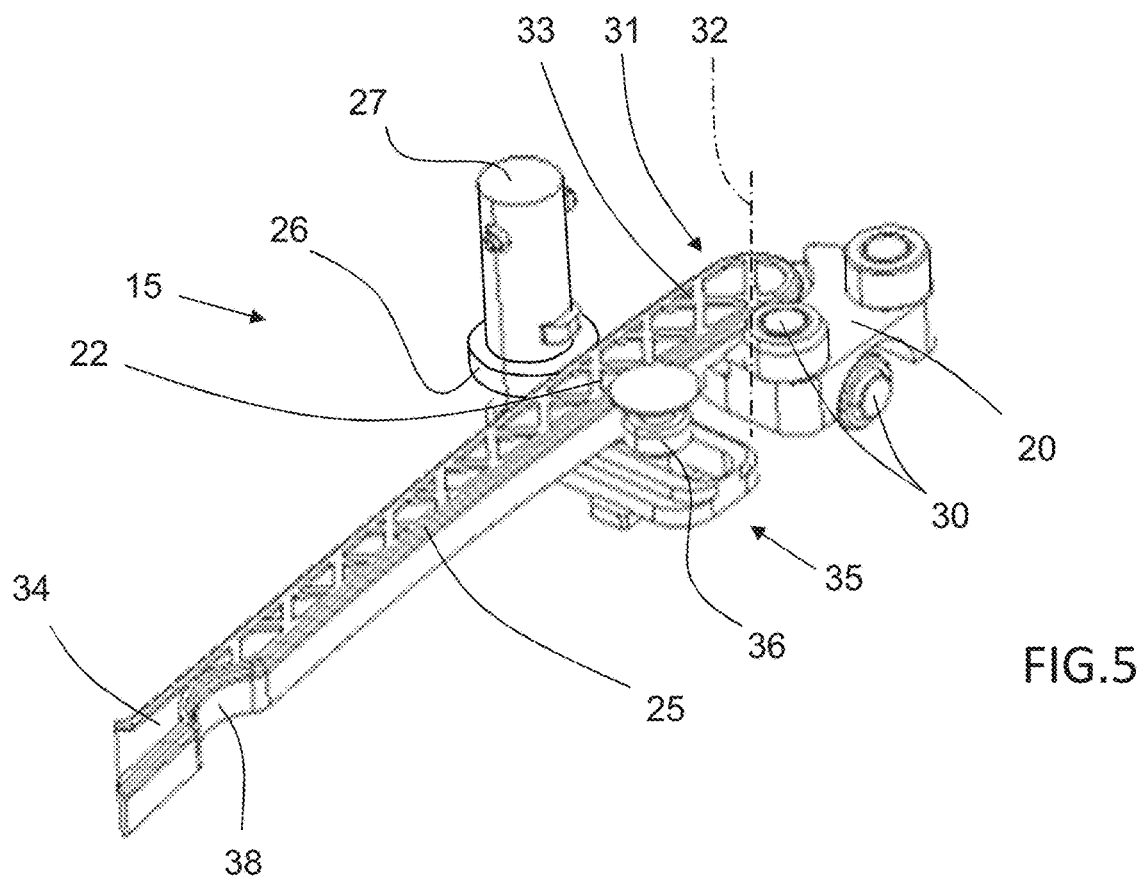
FIG. 5 shows a close-up view of the fastening arrangement of FIG. 4.

FIG. 5 schematically shows a more detailed perspective view of the lower fastening arrangement 15 having the motion element 20 configured for being movingly arranged within or on a vehicle body guiding rail 21 and the variable-length motion actuator 22, here in form of a rack and pinion actuator, connected to the motion element 20 and configured for being fastened to the sliding door 7 at a lower attachment area 23 of the sliding door 7.

In the example embodiment of FIG. 5, the motion element 20 comprises a carriage having at least two rollers 30 for rolling engagement with the vehicle body guide rail 21. The motion element 20 further comprises an attachment arrangement 31 for pivotal connection with the variable-length motion actuator 22 around a vertically extending pivoting axis 32.

The motion element 20 may however alternatively may composed of merely a single roller or the like, and the variable-length motion actuator may be pivotally connected to roller, such as for example to the roller axis.

A first end 33 of the rack 25 is pivotally connected to the motion element 20. A second end 34 of the rack, located oppositely from the first end 33 in a longitudinal direction of the rack 25, may be free, i.e. not connected to any other part.

The rack-and-pinion actuator schematically illustrated in FIG. 5 has a rack 25 with engagement members, such as engagement teeth (not showed), and a pinion 26 with corresponding engagement members, such as corresponding engagement teeth (not showed). The pinion 26 typically has a shape in form of a gear wheel. The rack 25 typically has an elongated straight or curved shape.

The rack and pinion actuator is a variable-length motion actuator 22 by operating the pinion 26, i.e. making the pinion to rotate around an axis of the shaft 27 by means of the motor. This causes the pinion 26 to travel along the rack 25 due to contact between the engagement members of the pinion and the corresponding engagement members of the rack, and since the pinion 26 is secured to the sliding door 7 at a lower attachment area of the sliding door 7, the pinion 26 and the sliding door 7 can move away or towards the motion element 20 by operation of the motor of the pinion 26.

The rack-and-pinion actuator further has a counter-pressure arrangement 35 for forcing the engagement members of the pinion 26 into driving engagement with the corresponding engagement members of the rack 25. In the example embodiment of FIG. 5, the counter-pressure arrangement 35 comprises a spring-loaded counter-wheel 36 that exerts a force on the rack 25 towards the pinion 26.

The rack-and-pinion actuator may further comprise a locking arrangement for providing selective locking of the rack-and-pinion actuator at a certain relative position of the rack 25 and pinion 26, in particular at an extended state of the rack-and-pinion actuator. In FIG. 5, such a locking arrangement is shown in form of a recess 38 on the rack 25 in the region of the second end 34 of the rack 25, wherein the recess 38 is configured for cooperating with the counter-wheel 36 for providing a locking functionality between the rack 25 and pinion 26 when the counter-wheel 36 enters the recess 38.

Figure 6:
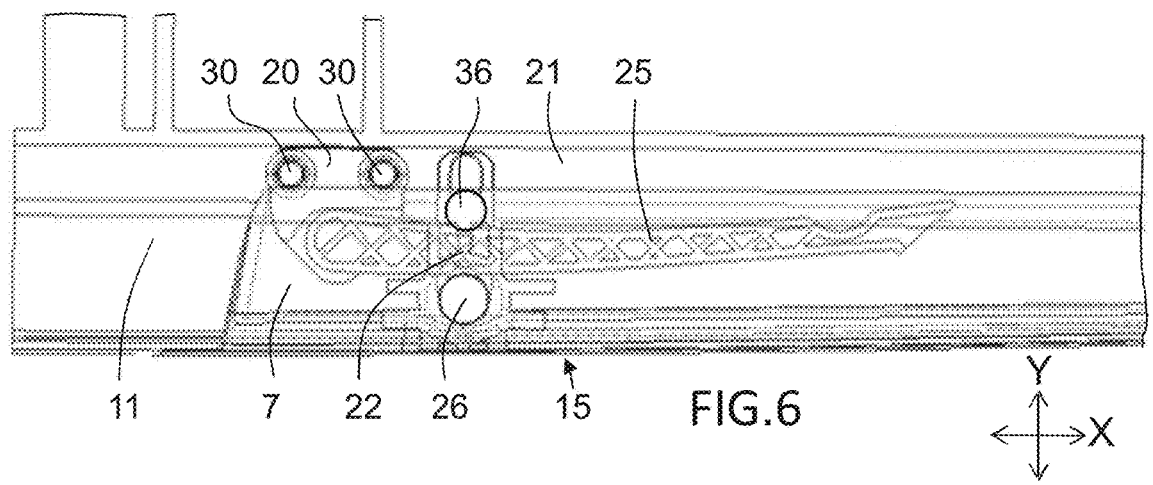
FIG. 6 shows a top view of the fastening arrangement in a closed position of the sliding door.

FIG. 6 schematically shows a top view of the sliding door 7, rack-and-pinion actuator, motion element 20 and vehicle body guiding rail 21 in a closed position of the sliding door 7. The pinion 26 is thus located in its closest position to the motion element 20. The rack 25 extends in a horizontal plane and nearly parallel with the longitudinal direction X of the vehicle.

Figure 7:
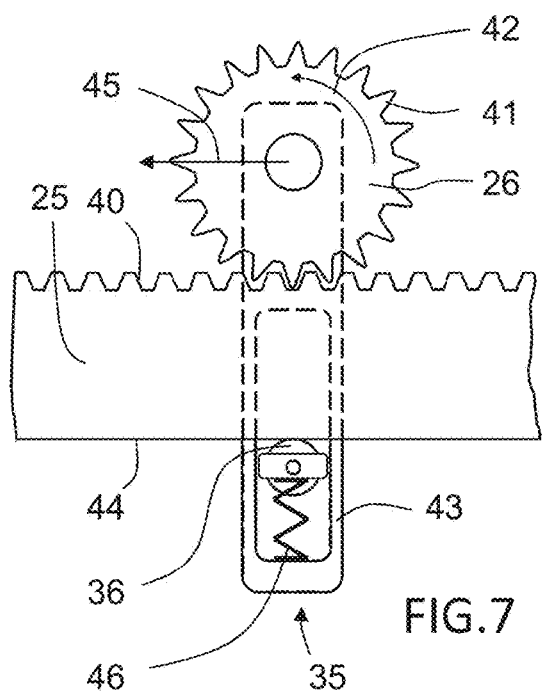
FIG. 7 shows an example embodiment of a rack-and-pinion actuator.

FIG. 7 schematically shows an example embodiment of a rack-and-pinion actuator having a rack 25 and a pinion 26. The rack 25 has a first surface with engagement teeth 40 configured for drivingly mating with corresponding engagement teeth 41 at the circumference of the pinion 26. Consequently, operation of the motor that causes rotation of the pinion anti-clockwise in FIG. 7, as shown by arrow 42, will cause the pinion and sliding door to move towards the left side in FIG. 7, as shown by arrow 45, when assuming that the rack 25 remains stationary.

The rack-and-pinion actuator of FIG. 7 further has a counter-pressure arrangement 35 in form of a frame member 43 with a spring-loaded wheel 36 that engages a second surface 44 of the rack 25, which second surface 44 is located opposite to the first surface of the rack 25. Since the common frame member 43 is connected to the pinion 26 while allowing relative rotation, the location of a spring 46 that urges the frame member 43 away from the spring-loaded wheel 36, the force of the spring 46 will simultaneously urge the pinion 26 into engagement contact with the rack 25.

Figure 8:
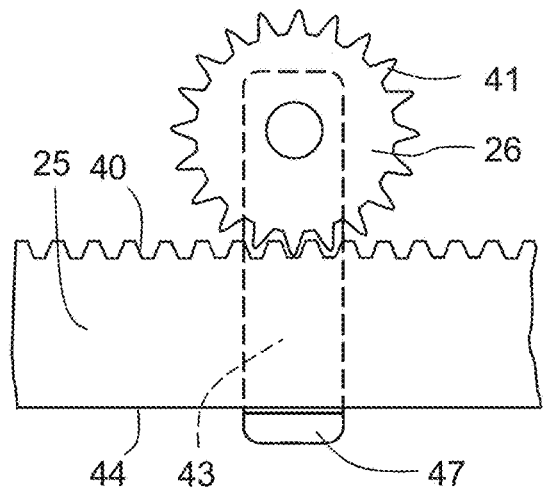
FIG. 8 shows still an example embodiment of a rack-and-pinion actuator.

FIG. 8 schematically shows an alternative design of the rack-and-pinion actuator, in which the counter-pressure arrangement is replaced with a rigid securing element 47 of the frame member 43, wherein the rigid securing element 47 is configured to be located closely to the second surface 44 of the rack 25, thereby preventing the pinion 26 from leaving the engagement contact with the rack 25. The rigid securing element 47 may be made of, or be lined with, a friction reducing material for enabling simplified sliding along the rack 25.

Figure 9:
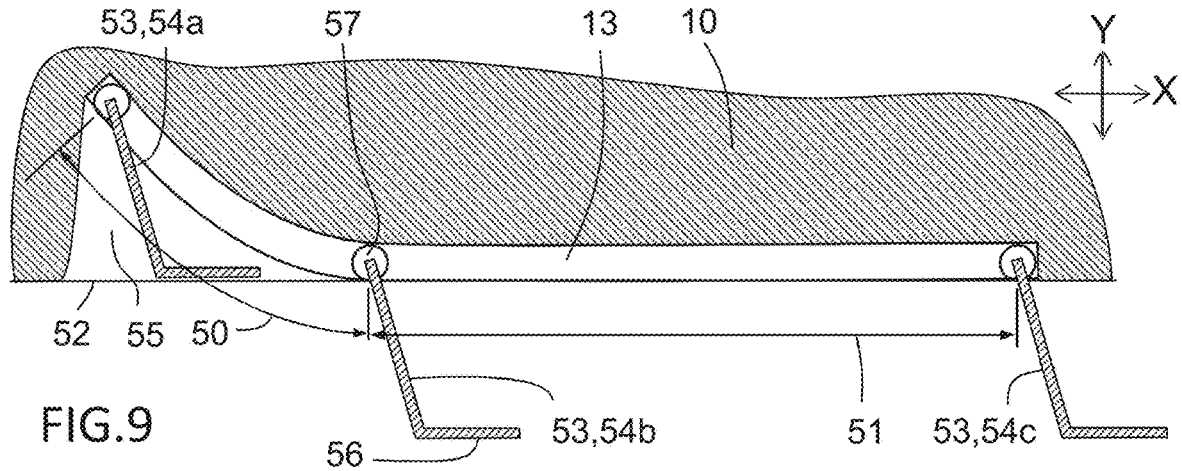
FIG. 9 shows an example embodiment of the upper fastening arrangement.

FIG. 9 schematically illustrates a top view of a cross-section of an example embodiment of the upper guide rail 13 of the upper fastening arrangement that is located at the roof 10 and/or roof rail of the vehicle body. The upper guide rail 13 has a laterally inwardly curved rail section 50 in a first longitudinal end region thereof, and a substantially straight rail section 51 extending substantially in the longitudinal direction X of the vehicle and adjacent a side edge 52 of the vehicle body at a second, opposite, longitudinal end region of the upper guide rail 13. The straight rail section 51 of the upper guide rail 13 is typically significantly longer than the curved rail section 50 of the guide rail 13. As a result of the curved rail section, a recess 55 is formed in the roof and/or roof rail of the vehicle body in the region of inwardly curved portion.

The sliding door (not showed) may for example be attached to the upper guide rail 13 by attaching the sliding door to an outer surface 56 of a solid and non-adjustable bracket 53, which may be of any shape, design or composition. The bracket 53 may be connected to the upper guide rail via an upper motion element 57. The upper motion element 57 may be composed of merely a roller, as illustrated in the example embodiment of FIG. 9, or of carriage slidingly attached to the upper guide rail 13 by one or more rollers, or the like.

The bracket 53 is illustrated in three example positions along the upper guide rail in FIG. 9, namely a first position 54a corresponding to a closed position of the sliding door 7, a second position 54b corresponding to an intermediate position of the sliding door 7, and a third position 54c corresponding to a completely open position of the sliding door 7. Clearly, the bracket 53 may take any position between the two end positions, which are defined by the first and third positions 54a, 54c, respectively.

Having the sliding door 7 in a closed position, as shown in FIGS. 1 and 6, involves having the rack-and-pinion actuator in a contracted state and the bracket 53 of the upper fastening arrangement being located in the first position 54a, as shown in FIG. 9.

Having the sliding door 7 in a completely open position, as shown in FIG. 2, involves having the rack-and-pinion actuator in an extended state and the bracket 53 of the upper fastening arrangement being located in the third position 54c, as shown in FIG. 9.

Having the sliding door 7 in an intermediate position, involves having the rack-and-pinion actuator in an extended state and the bracket 53 of the upper fastening arrangement being located in the second position 54b, as shown in FIG. 9.

Upon opening the sliding door 7 the rack-and-pinion actuator is thus first extended from the contracted state to the extended state by operation of the motor that drives the pinion 26. This extension of the rack-and-pinion actuator causes the bracket 53 to move from the first position 54a to the second position 54b, and the sliding door 7 to move from the closed position to the intermediate position.

Thereafter, an additional motor (not showed), drivingly connected to the sliding door 7 and for example arranged adjacent the central fastening arrangement, may be controlled to pull the sliding door from the intermediate position to the completely open position. Alternatively, the sliding door 7 may be pushed from the intermediate position to the completely open position manually.

In other words, the fastening arrangement may comprise an upper fastening arrangement providing sliding connection of the sliding door 4 to the vehicle body between an open and a closed position of the sliding door 7, wherein the upper fastening arrangement includes a vehicle body upper guide rail 13 located adjacent a vehicle body roof 10 or roof rail and having a straight rail section 51 and an inwardly curved rail section 50, an upper motion element 57 movingly arranged within or on the vehicle body upper guiding rail 13, and a solid bracket 53 connecting an upper attachment area of the sliding door to the upper motion element 57, wherein at a closed position of the sliding door 7 the variable-length motion actuator 22 is in a contracted state and the upper motion element 57 is located at an inner end region of the curved rail section 50, wherein at an intermediate position of the sliding door the variable-length motion actuator 22 is in an extended state and the upper motion element 57 is located in an outer end region of the curved rail section 50.

Figure 10A:
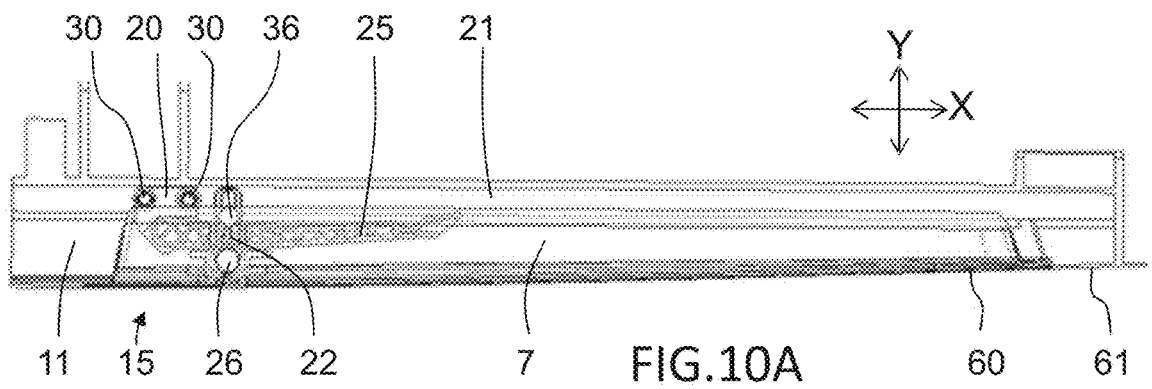
FIG. 10A-10C show three positions of the sliding door during an opening or closing sequence.
Figure 10B:
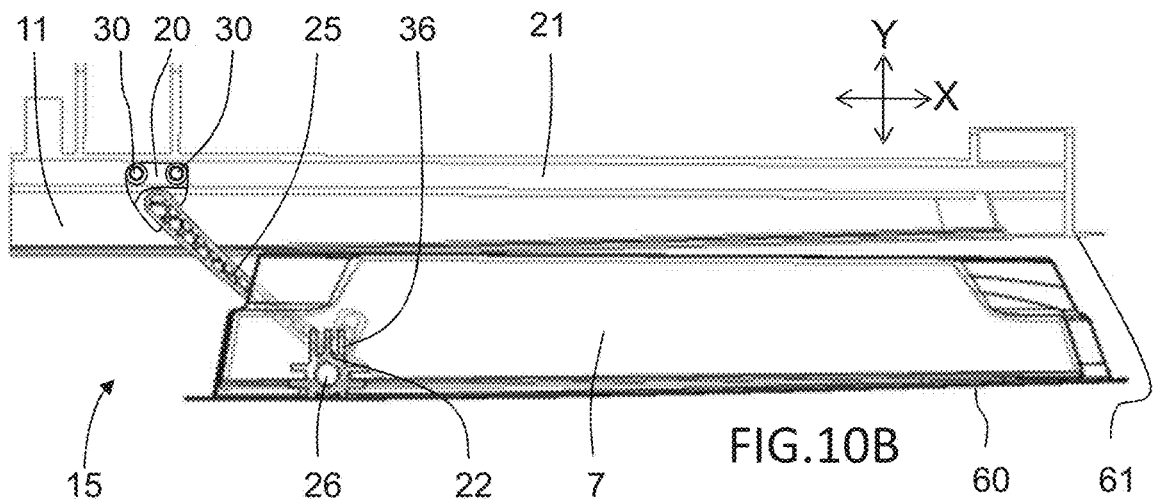
Figure 10C:
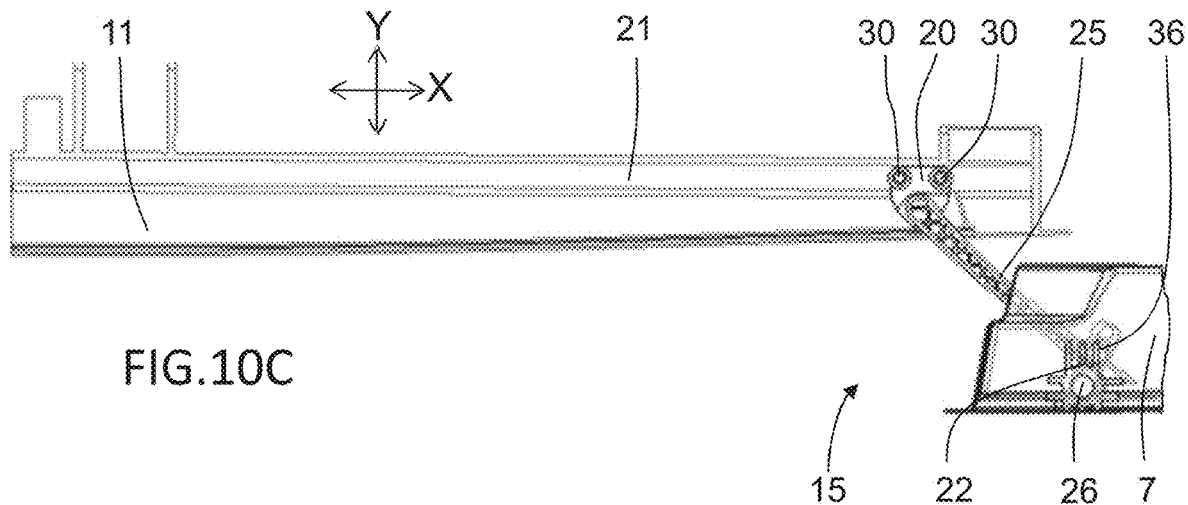

FIGS. 10A-10C schematically shows top views of the lower fastening arrangement 15 in the three aforementioned example positions along the upper guide rail in FIG. 9, namely the closed position of the sliding door 7 in FIG. 10A, the intermediate position of the sliding door 7 in FIG. 10B, and the completely open position of the sliding door 7 in FIG. 10C.

In FIG. 10A the sliding door is in a closed position, the variable-length motion actuator 22 is in the contracted state and the motion element 20 is located in a longitudinal side portion of the guiding rail 21 associated with the closed position of the sliding door 7. A lateral exterior surface 60 of the sliding door is substantially flush with a lateral exterior surface 61 of the vehicle.

According to one example embodiment for arriving at this position, the additional motor first pushed the sliding door 7 in the longitudinal direction X towards the closing position of the sliding door 7, and upon arriving at the intermediate position the variable-length motion actuator 22 started to contract from the extended state to the contracted state. During the contraction motion of the variable-length motion actuator 22 the motion element 20 may be prevented from sliding back towards the open position of the sliding door 7 by for example by continued pushing force from the additional motor, or by locking motion of the motion element 20 by some type of locking arrangement.

Moreover, during the contraction motion of the variable-length motion actuator 22 the motion path of the sliding door from the intermediate position to the closed position is controlled partly by the upper guide rail 13. However, in case also the upper fastening arrangement comprises a variable-length motion actuator connected to the motion element and configured for sliding along a substantially straight guide rail the exact motion path of the sliding door may be less foreseeable.

In FIG. 10B the sliding door is in the intermediate position, the variable-length motion actuator 22 is in the extended state and the motion element 20 has not moved and is thus still located in a longitudinal side portion of the guiding rail 21 associated with the closed position of the sliding door 7. The lateral exterior surface 60 of the sliding door is now located significantly laterally outwards beyond the lateral exterior surface 61 of the vehicle.

In FIG. 10C the sliding door is in the completely open position, the variable-length motion actuator 22 is still in the extended state and the motion element 20 has now moved along the straight section 51 of the upper guide rail 13 towards a longitudinal side portion of the guiding rail 21 associated with the open position of the sliding door 7.

In other words, the sliding door 7 is configured for performing a first motion sequence and subsequently a second motion sequence upon moving from a closed position to an open position of the sliding door 7, wherein the first motion sequence involves extending the variable-length motion actuator 22 from a contracted state to an extended state, thereby causing the sliding door 7 to displace from a closed position to an intermediate position while the motion element 20 remains stationary, and the second motion sequence involves displacing the motion element 20 along the vehicle body guiding rail 21, thereby causing the sliding door 7 to displace primarily in a longitudinal direction X of the vehicle body from the intermediate position to an open position of the sliding door 7 while the variable-length motion actuator 22 remains in the extended state.

Figure 11A:
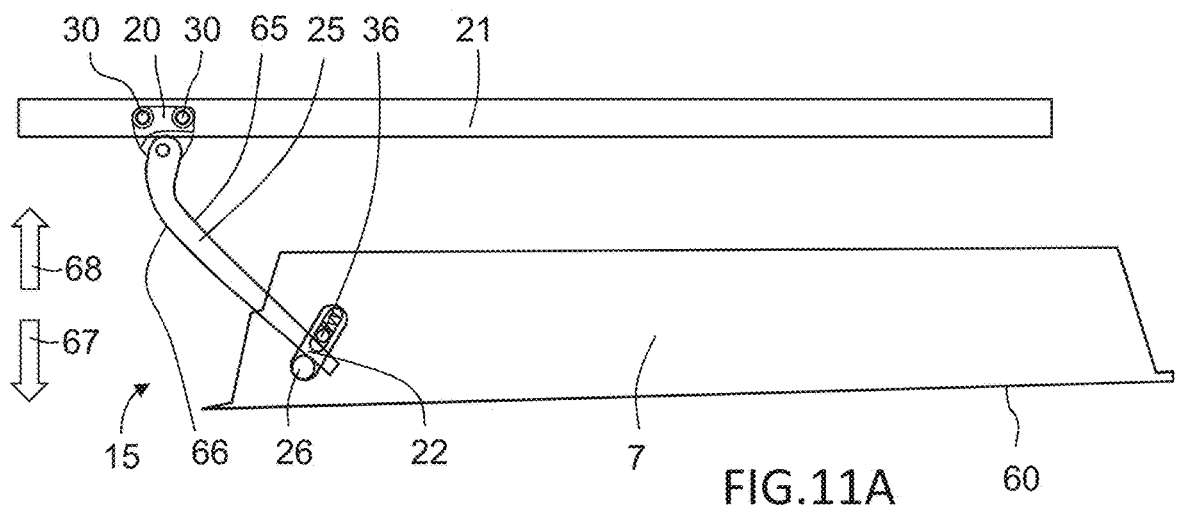
FIG. 11A-11B show two positions of the sliding door including an alternative embodiment of the variable-length motion actuator.
Figure 11B:
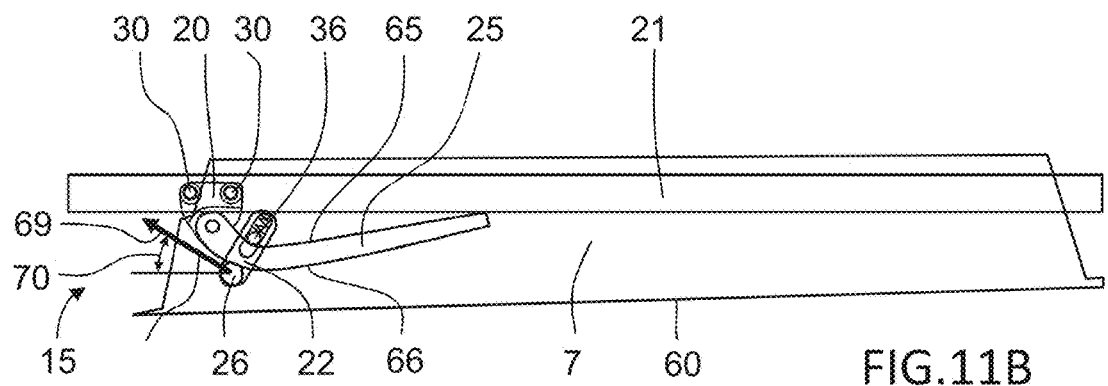

FIGS. 11A and 11B schematically shows top views of an alternative embodiment of the lower fastening arrangement 15 and the sliding door 7 in the intermediate position of the sliding door 7 in FIG. 11A and in the closed position of the sliding door 7 in FIG. 11B. The difference is the shape and form of the rack 25, which in this example embodiment has a more curved shape.

In particular, the rack 25 has a laterally outwardly curved shape, as seen from a top view facing downwards on the vehicle and with the sliding door 7 in a closed position, wherein a convex side 66 of the curved rack 25 faces towards the outside 67 of the vehicle and the concave side 65 of the curved rack 25 faces towards the inside 68 of the vehicle, in the lateral direction Y of the vehicle.

This laterally outwardly curved shape results in a closing force vector 69, generated by interaction of the pinion 26 and rack 25 and acting on the sliding door at the lower attachment area of the sliding door in a closed position of the sliding door, that has a component that is directed laterally inwards towards the inside 68 of the vehicle body.

This inwardly directed closing force vector 69 may in certain situations and implementations simplify closing the of the sliding door 7 because the sliding door 7 often has to move laterally inwards during the end phase of the closing sequence of the sliding door 7.

In the example embodiment of FIG. 11B the closing force vector 69 defines an angle 70 of about 30 degree with the longitudinal direction X of the vehicle. However, the closing force vector 69 may define an angle 70 in the range of 5-70 degrees, and specifically in the range of 10-45 degrees.

Figure 12:
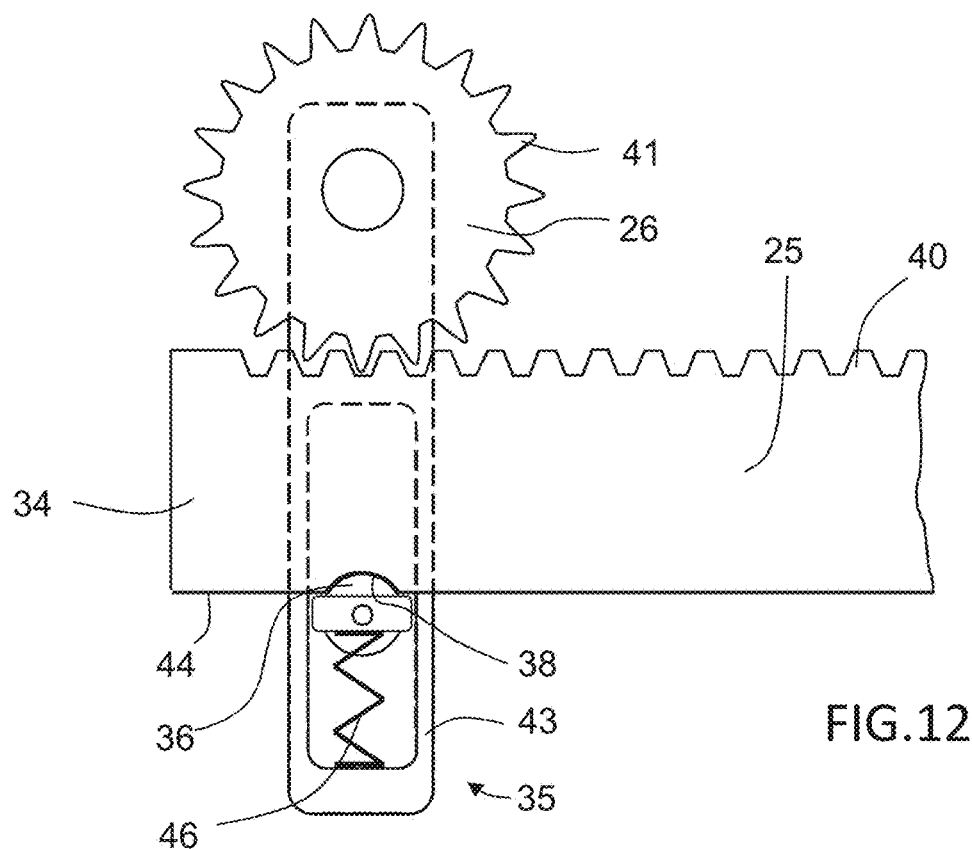
FIG. 12 shows an example embodiment of the locking arrangement.

The locking arrangement of the rack-and-pinion actuator was described above with reference to FIG. 5. This locking arrangement will now be described more in detail with reference to FIG. 12, which shows a schematic view of the rack-and-pinion actuator in a locked state. The locking is performed by having the counter-wheel 36 becoming located in the recess 38 that is located at the region of the second end 34 of the rack 25, wherein the spring 46 of the counter-pressure arrangement 35 urges the counter-wheel 36 into locking engagement contact with the recess 38 of the rack 25. This locking arrangement has a limited locking strength, depending on for example the spring force of the spring 46, the depth of the recess, etc.

Figure 13:
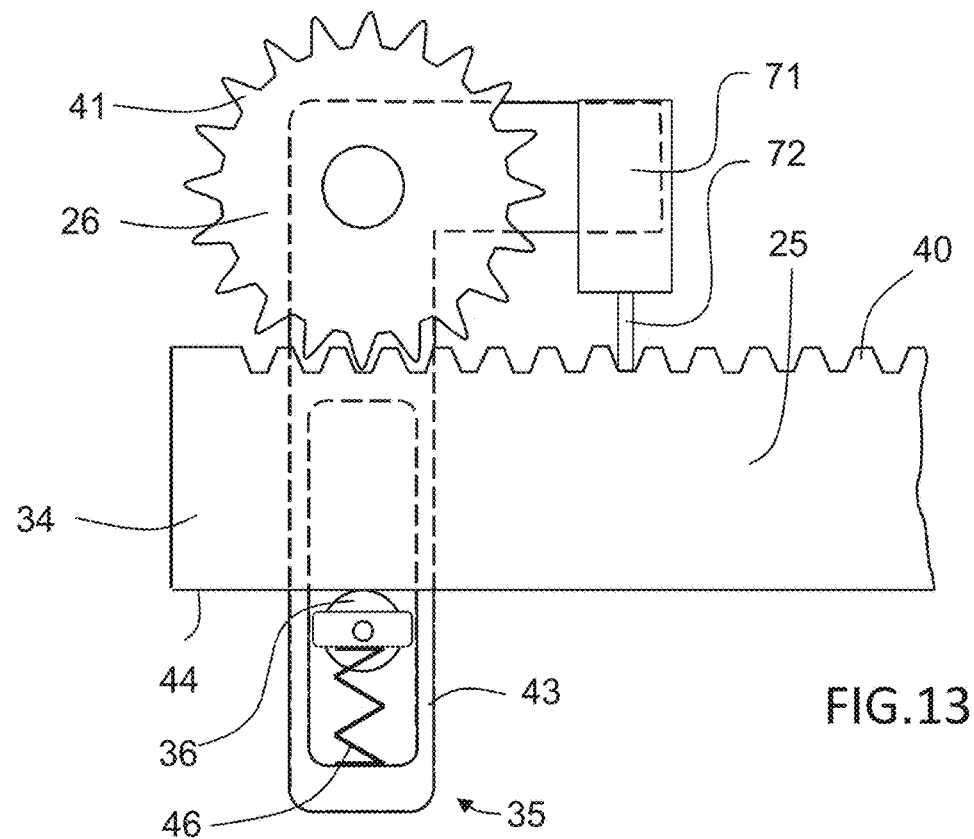
FIG. 13 shows still an example embodiment of the locking arrangement.

Still an alternative example embodiment of the locking arrangement of the rack-and-pinion actuator is described with reference to FIG. 13, wherein an actuator 71, such as an electromagnetic actuator 71 is configured to be secured to the sliding door 7 and configured to selectively control a motion of an actuator pin 72 between a locking position, as illustrated in FIG. 13, in which the pin 72 is protruding and in engagement with the engagement teeth 40 of the rack 25, for locking of relative motion of the rack 25 and pinion 26, and an unlocked position, in which the pin 72 is withdrawn and not in engagement with the engagement teeth 40 of the rack 25. The actuator 71 may for example be attached to the common frame member 43. Moreover, the pin 72 may alternatively be configured to lockingly interact with other parts of the rack 25.

Still more alternatively, the motor (not showed) may comprise a locking arrangement for providing selective locking of the rack-and-pinion actuator at a certain relative position of the rack 25 and pinion 26. For example, the motor may include a locking functionality that prevents rotation of the motor output shaft. Furthermore, if some type of speed reduction gearbox is installed between the motor and pinion, the locking arrangement for may include a locking functionality in the reduction gearbox that prevents rotation of the gearbox output shaft.

FIGS. 14A and 14B schematically show a cross-section of the sliding door 7 and the rocker 11 of the vehicle in a vertical plane that is parallel with the lateral direction Y of the vehicle, wherein FIG. 14A shows the sliding door in the closed position and FIG. 14B shows the sliding in the open position.

As clearly illustrated in FIGS. 14A and 14B, the variable-length motion actuator is configured for providing a first distance 80 between the motion element 20 and the lower attachment area 82 of the sliding door 7 in a closed position of the sliding door 7 and a second distance 81 between the motion element 20 and the lower attachment area 82 of the sliding door 7 in an open position of the sliding door 7, and in that the second distance 81 is larger than the first distance 80. The difference between the first and second distances 80, 81 may for example be at least factor 2, specifically at least a factor 3, and more specifically at least a factor 4.

In this example embodiment, the output axis 82 of the motor 85 was used as reference point for the term lower attachment area 82 of the sliding door 7.

Moreover, FIGS. 14A and 14B shows the guide rail 21, the motion element 20 and its rollers 30, the pinion 26, the rack 25 and the pivotal connection between the motion element 20 and the rack 25 around a vertically extending pivoting axis at the connection point 24.

As clearly shown in FIGS. 14A and 14B, the motor 85 is located within the sliding door 7. Moreover, the pinion 26 may be rotationally fastened directly on an output shaft of the motor 85. Alternatively, some type of reduction gear arrangement may be provided between the motor output shaft and pinion 26 for providing a slower and more appropriate sliding door opening and closing motion. In such case the pinion 26 may be drivingly connected to the motor 85 but having a separate and individual attachment for securing the pinion 26 to the sliding door 7.

Figure 15A:
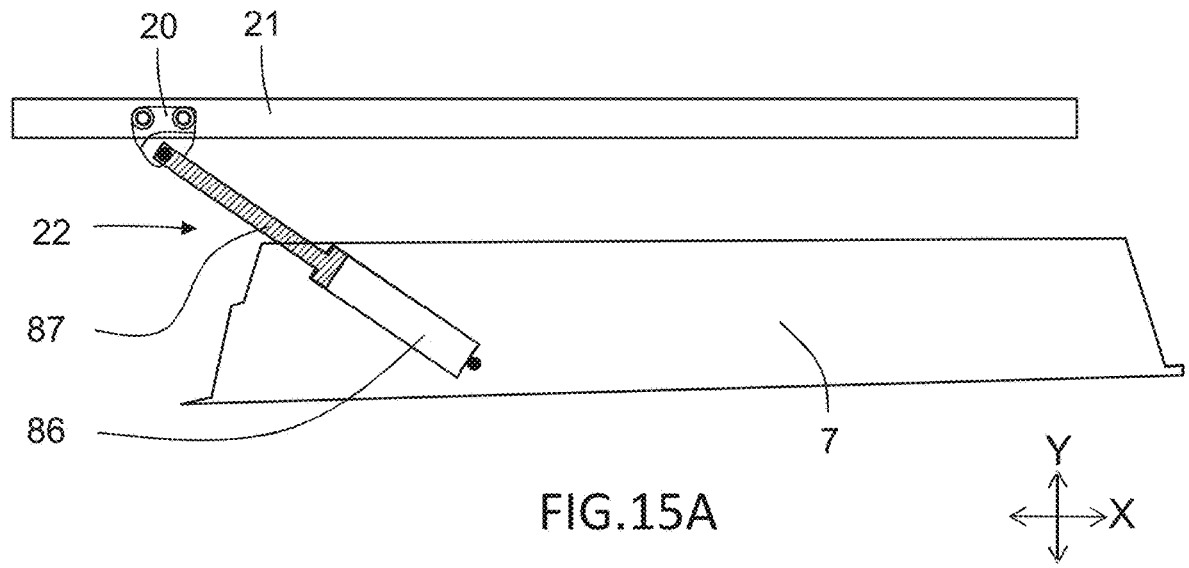
FIGS. 15A and 15B show still an alternative embodiment of the variable-length motion actuator.
Figure 15B:
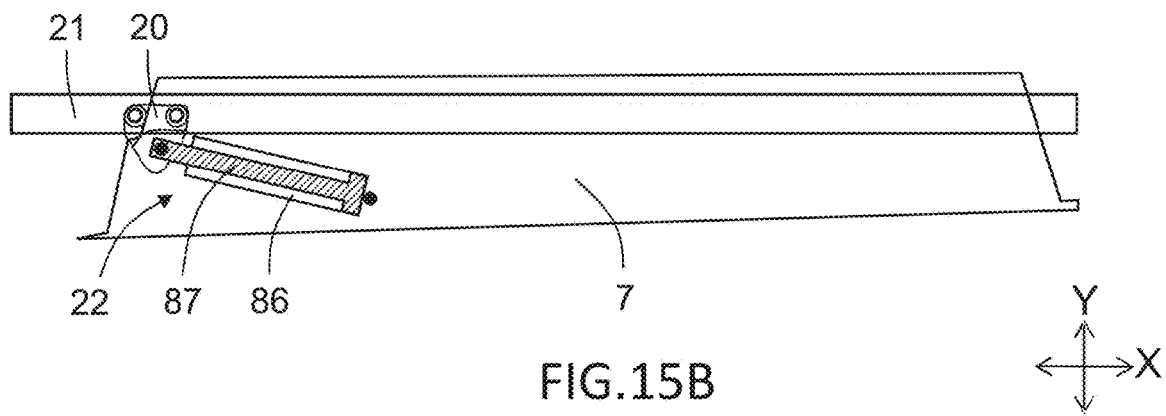

The variable-length motion actuator 22 has been primarily described as a rack-and-pinion actuator but alternative designs are possible and may be more appropriate in certain situations. For example, according to an example embodiment the variable-length motion actuator 22 may be a cylinder-piston device, as schematically shown with reference to FIGS. 15A and 15B, which show top views of an alternative embodiment of the lower fastening arrangement 15 and the sliding door 7 in the intermediate position of the sliding door 7 in FIG. 15A and in the closed position of the sliding door 7 in FIG. 15B.

The cylinder-piston device typically comprises a cylinder 86 and a piston with piston rod 87 being slidingly moveable relative to the cylinder 86. Moreover, the cylinder-piston device may for example be pneumatically or hydraulically driven for enabling powered variable distance between the motion element 20 and the lower attachment area of the sliding door 7.

Still more alternatively, the variable-length motion actuator 22 may for example be a spindle drive comprising a threaded shaft that is rotationally powered by the motor, such that a nut threadingly provided on the threaded shaft may be moved along the threaded shaft by rotating the shaft and preventing the nut from rotating. A nut of the spindle drive may for example be connected to the motion element and a connection point of the spindle drive housing may be connected to the sliding door, or oppositely.

With reference to FIGS. 16-18b, the fastening arrangement may according to some example embodiments be non-powered, i.e. wherein the variable-length motion mechanism 22 merely provides motion control, stability and motion guidance, and wherein for example a user must apply muscle force for providing the necessary force for moving the sliding door 7 between the open and closed positions, or wherein a single electric motor associated with the central fastening arrangement or the upper fastening arrangement is provided for moving the sliding door 7 between the open and closed positions.

Figure 16A:
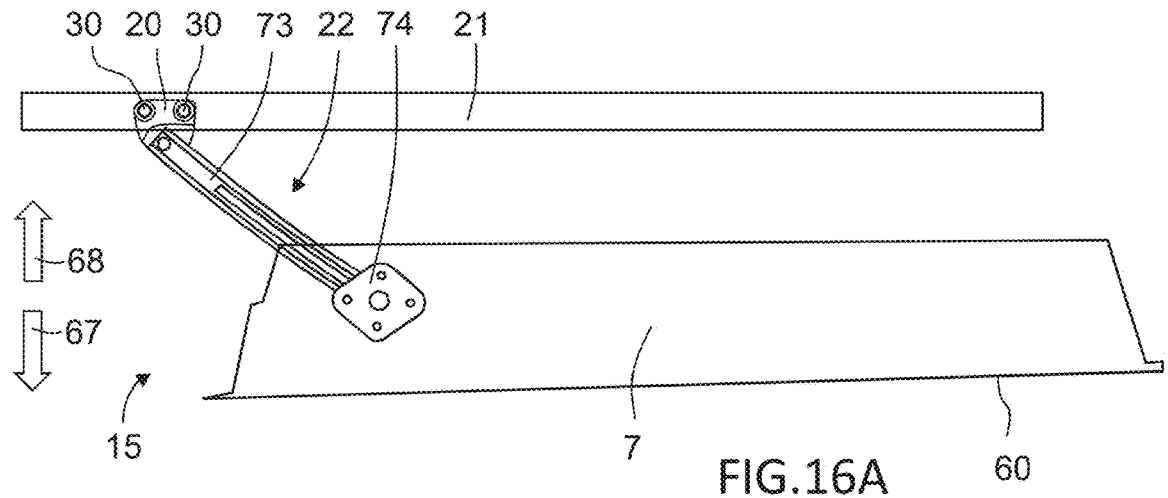
FIGS. 16A and 16B show yet a further alternative embodiment of the variable-length motion mechanism.
Figure 16B:
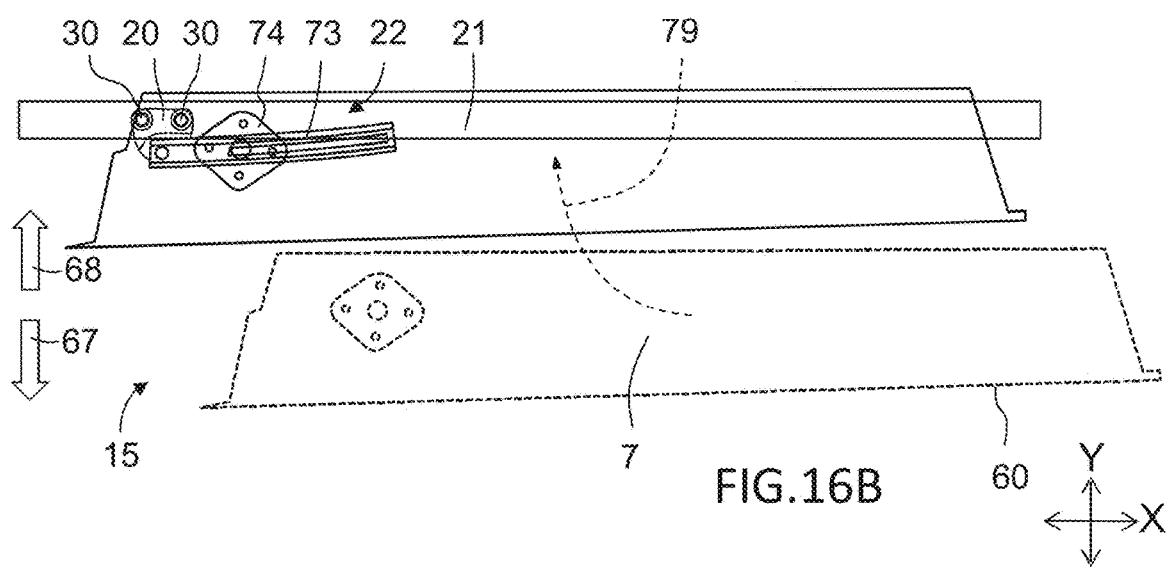

FIG. 16A schematically shows a top view of an example non-powered embodiment of the lower fastening arrangement 15, wherein the variable-length motion mechanism 22 is in the extended state, which typically corresponds to the sliding door 7 being located in the intermediate position. FIG. 16B shows a corresponding top view of the lower fastening arrangement 15, wherein the variable-length motion mechanism 22 is in the contracted state, which typically corresponds to the sliding door 7 being located in the closed position.

Moreover, the position and state of the sliding door when having a completely extended or completely contracted variable-length motion mechanism 22, as well as an example version of a motion path 79 of the sliding door when travelling between said completely extended and contracted states, are included with dashed lines in FIG. 16B, assuming a stationary motion element 20. The motion of the travel element 74, and the sliding door 7 to which the travel element 74 is attached, upon passing from the extended state to the contracted state, thus typically extend both in the longitudinal direction X and lateral direction Y of the vehicle. For example, said motion of the travel element 74, and the sliding door 7 to which the travel element 74 is attached, upon passing from the extended state to the contracted state, may correspond to substantially equal amount of travel in the longitudinal direction X and lateral direction Y of the vehicle, or at least differing less than 50%. This type of motion applies also to the embodiments of the fastening arrangement described with reference to FIGS. 3-14A.

Many aspect of the fastening arrangement 15 with non-powered variable-length motion mechanism 22 of FIG. 16-16B is identical to the fastening arrangement 15 with powered variable-length motion mechanism 22 shown with reference to FIGS. 10A-10B, such as the guiding rail 21, motion element 20, sliding door 7, etc., and reference is made to associated description for details.

In the example embodiment illustrated in FIGS. 16A-16B, the variable-length motion mechanism 22 includes an arm 73 and a travel element 74, wherein the arm 73 is pivotally connected to the motion element 20, wherein the travel element 74 is secured to, and can travel along the length of, the arm 73, and wherein the travel element 74 is configured for being fastened to the sliding door 7 at the lower attachment area of the sliding door 7 for enabling variable distance between the motion element 20 and the lower attachment area of the sliding door 7.

When a closing force is applied on the sliding door 7 positioned in the intermediate position, as shown in FIG. 16A, the travel element 74 will start traveling along the arm 73, from a free end of the arm 73 towards the end of the arm 73 that is pivotally attached to the motion element 20, until the sliding door 7 reaches the closed position, as illustrated in FIG. 16B.

The travel element 74 may for example have a sliding contact or rolling contact with the arm 73, thereby enabling a sliding motion or a rolling motion along the arm 73. A rolling contact may for example be provided by intermediate rollers. In fact, the rack and pinion solution described with reference to FIGS. 3-14B may qualify as a variable-length motion mechanism 22 including an arm 73 (rack) and a travel element 74 (pinion) that is secured to, and can travel along the length of, the arm 73.

Figure 17:
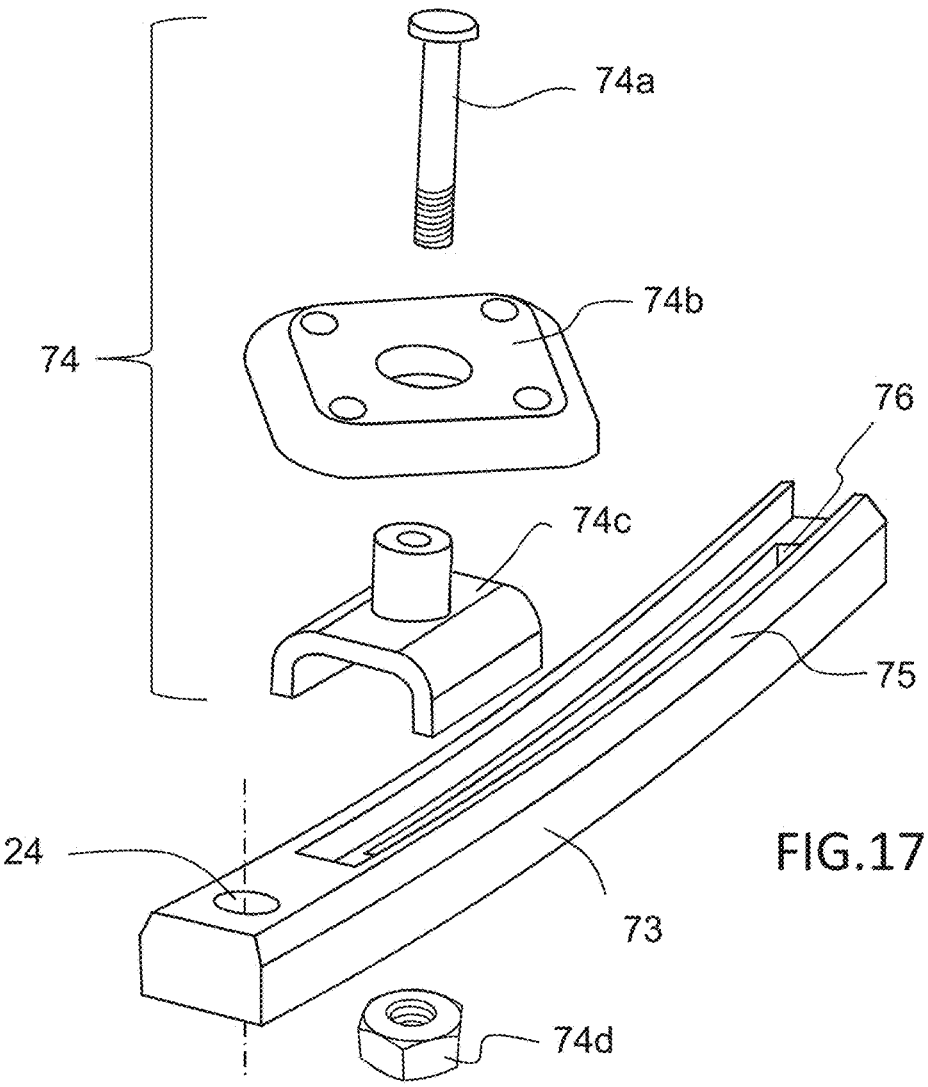
FIG. 17 shows an exploded view of the variable-length motion mechanism.

FIG. 17 shows an exploded view of one example embodiment of a variable-length motion mechanism 22 including an arm 73 with associated travel element 74. The arm 73 may for example have a hole at a connection point 24 for pivotal connected to the motion element 20 (now showed) around a more or less vertically extending pivoting axis. The arm 73 may for example be a single piece element having an elongated, straight or slightly curved, shape. Furthermore, the arm 73 may have a sliding surface 75 for sliding contact with the travel element 74.

The travel element 74 may be a sliding element arranged for sliding motion along the length of the arm 73. The travel element 74 may have a sled 74c, an interface element 74b for connection with the sliding door 7, and a fastener 74a, such as a threadened fastener 74a with a nut 74d, for movingly connecting the travel element 74 to the arm 73. The sled 74c and interface element 74 may alternatively be integrated into a single part. Moreover, the interface element 74b may have holes or the like for receiving fasteners for attaching the interface element 74b to the sliding door 7.

The sled 74c may for example have downwardly extending side walls configured for surrounding the top and lateral sidewalls of the arm 73 for improves guidance of the travel element 74 along the arm 73.

In addition, the arm 73 may have an elongated channel 76 extending along the length of the arm 73 and having an elongated through-passage for enabling secure fastening of the travel element 74 to the arm 73, for example via the fastener 74a.

Figure 18:
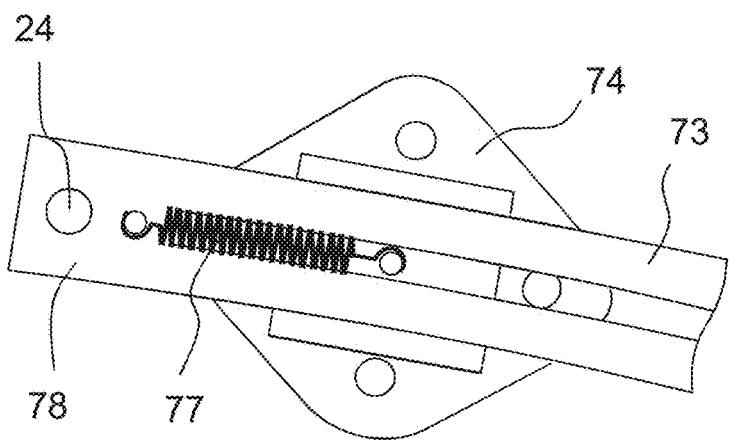
FIG. 18 shows a variable-length motion mechanism having a spring.

As illustrated in FIG. 18, the variable-length motion mechanism 22 may additionally include a mechanical spring 77 having a first end and a second end, wherein the first end is connected to the motion element 20 or an end region 78 of the arm 73 being connected to the motion element 20, and the second end is connected to the travel element 74. The spring 77 will be extended upon opening the sliding door 7 and thus movement of the travel element 74 away from the pivotal connection point 24 of the arm 73, and thereby simplify subsequent closing of the sliding door 7 by exerting a closing force on the sliding door 7 when being in the extended state.

Figure 19:
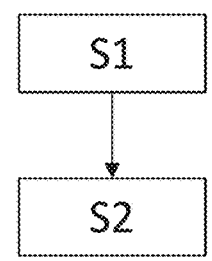
FIG. 19 shows the main steps of a method for opening a sliding door of a vehicle.

With reference to FIG. 19, the disclosure also relates to a method for opening a sliding door 7 of a vehicle having a vehicle body and a fastening arrangement for fastening the sliding door 7 to the vehicle body while enabling opening and closing of the sliding door 7, wherein the fastening arrangement comprises a motion element 20 movingly arranged within or on the vehicle body guiding rail 21 for enabling movement of the motion element 20 along the vehicle body guiding rail 21, and a variable-length motion mechanism 22 connected to the motion element 20 and fastened to the sliding door 7 at a lower attachment area of the sliding door 7. The method comprises a first step S1 of performing a first motion sequence involving extension of the variable-length motion mechanism 22 from a contracted state to an extended state, thereby causing the sliding door 7 to displace from a closed position to an intermediate position while the motion element 20 remains substantially stationary, and subsequently a second step S2 of performing a second motion sequence involving displacing the motion element 20 along the vehicle body guiding rail 21, thereby causing the sliding door 7 to displace primarily in a longitudinal direction X of the vehicle body from the intermediate position to an open position of the sliding door 7 while the variable-length motion mechanism 22 remains in the extended state.

In some example embodiments, the variable-length motion mechanism 22 is a variable-length motion actuator 22, and the first method step S1 of performing the first motion sequence involves powered extension of the variable-length motion actuator 22 from the contracted state to the extended state.

Although the disclosure has been described in relation to specific combinations of components, it should be readily appreciated that the components may be combined in other configurations as well which is clear for the skilled person when studying the present application. Specifically, individual components or features the various embodiments of the fastening arrangement described with reference to FIGS. 3-14B may be combined with the embodiment of the fastening arrangement described with reference to FIGS. 15A-b or FIGS. 16A-19. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The use of the word "a" or "an" in the specification may mean "one," but it is also consistent with the meaning of "one or more" or "at least one." The term "about" means, in general, the stated value plus or minus 10%, or more specifically plus or minus 5%. The use of the term "or" in the claims is used to mean "and/or" unless explicitly indicated to refer to alternatives only.

The terms "comprise", "comprises" "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

What is claimed is:

1. A vehicle having a vehicle body with a vehicle body guiding rail, a sliding door, and a fastening arrangement for fastening the sliding door to the vehicle body while enabling opening and closing of the sliding door, the fastening arrangement comprising:
- a motion element movably arranged within or on the vehicle body guiding rail for enabling movement of the motion element along the vehicle body guiding rail, and
- a variable-length motion actuator fastened to the sliding door at a lower attachment area of the sliding door and connected to the motion element, wherein the variable-length motion actuator enables powered variable distance between the motion element and the lower attachment area of the sliding door, wherein the variable-length motion actuator includes an arm and a travel element, wherein the arm is pivotally connected to the motion element, wherein the travel element is secured to, and can travel along a length of the arm, and wherein the travel element is fastened to the sliding door at the lower attachment area of the sliding door for enabling variable distance between the motion element and the lower attachment area of the sliding door,
- wherein the variable-length motion actuator is a rack-and-pinion actuator.

2. The vehicle according to claim 1, wherein the variable-length motion actuator provides a first distance between the motion element and the lower attachment area of the sliding door in a closed position of the sliding door and a second distance between the motion element and the lower attachment area of the sliding door in an open position of the sliding door, and wherein the second distance is larger than the first distance.

3. The vehicle according to claim 1, wherein a first end of the rack is pivotally connected to the motion element, and wherein the pinion is drivingly connected to a motor and secured to the sliding door.

4. The vehicle according to claim 3, wherein the pinion is rotationally fastened on an output shaft of the motor.

5. The vehicle according to claim 1, wherein the rack-and-pinion actuator has a counter-pressure arrangement for forcing driving engagement members of the pinion into driving engagement with corresponding driving engagement members of the rack.

6. The vehicle according to claim 1, wherein the rack-and-pinion actuator has a locking arrangement providing selective locking of the rack-and-pinion actuator at a certain relative position of the rack and pinion, in particular at an extended state of the rack-and-pinion actuator.

7. The vehicle according to claim 1, wherein the vehicle body guiding rail has a substantially linear guide path enabling a substantially linear movement of the motion element along the vehicle body guiding rail.

8. The vehicle according to claim 1, wherein the motion element comprises a carriage having at least two rollers for rolling engagement with the vehicle body guide rail and an attachment arrangement for pivotal connection with the variable-length motion actuator.

9. The vehicle according to claim 1, wherein the pinion is drivingly connected to a motor, and the motor is located within the sliding door.

10. The vehicle according to claim 1, wherein the rack has an outwardly curved shape, as seen from a top view facing downwards on the vehicle and with the sliding door in a closed position, such that a closing force vector generated by interaction of the pinion and rack, acting on the sliding door at the lower attachment area of the sliding door in a closed position of the sliding door, has a component that is directed laterally inwards towards the vehicle body.

11. The vehicle according to claim 1, wherein the fastening arrangement further comprising an upper fastening arrangement providing sliding connection of the sliding door to the vehicle body between an open and a closed position of the sliding door, wherein the upper fastening arrangement includes a vehicle body upper guide rail located adjacent a vehicle body roof or roof rail and having a straight rail section and an inwardly curved rail section, an upper motion element movingly arranged within or on the vehicle body upper guiding rail, and a solid bracket connecting an upper attachment area of the sliding door to the upper motion element, wherein at a closed position of the sliding door the variable-length motion actuator is in a contracted state and the upper motion element is located at an inner end region of the curved rail section, wherein at an intermediate position of the sliding door the variable-length motion actuator is in an extended state and the upper motion element is located in an outer end region of the curved rail section.

12. The vehicle according to claim 1, wherein the sliding door performs a first motion sequence and subsequently a second motion sequence upon moving from a closed position to an open position of the sliding door, wherein the first motion sequence involves extending the variable-length motion actuator from a contracted state to an extended state, thereby causing the sliding door to displace from a closed position to an intermediate position while the motion element remains stationary, and the second motion sequence involves displacing the motion element along the vehicle body guiding rail, thereby causing the sliding door to displace primarily in a longitudinal direction of the vehicle body from the intermediate position to an open position of the sliding door while the variable-length motion actuator remains in the extended state.

13. A method for opening a sliding door of a vehicle having: a vehicle body with a vehicle body guiding rail; and a fastening arrangement for fastening the sliding door to the vehicle body while enabling opening and closing of the sliding door,
- wherein the fastening arrangement comprises a motion element movingly arranged within or on the vehicle body guiding rail for enabling movement of the motion element along the vehicle body guiding rail, and a variable-length motion mechanism connected to the motion element and fastened to the sliding door at a lower attachment area of the sliding door, wherein the variable-length motion mechanism includes an arm and a travel element, wherein the arm is pivotally connected to the motion element, wherein the travel element is secured to, and can travel along a length of the arm, and wherein the travel element is fastened to the sliding door at the lower attachment area of the sliding door for enabling variable distance between the motion element and the lower attachment area of the sliding door, the method comprises:
- performing a first motion sequence involving extension of the variable-length motion mechanism from a contracted state to an extended state by means of the travel element that travels along the length of the arm, from the end of the arm that is pivotally attached to the motion element towards a free end of the arm, thereby causing the sliding door to displace from a closed position to an intermediate position while the motion element remains substantially stationary, and
- performing a second motion sequence involving displacing the motion element along the vehicle body guiding rail, thereby causing the sliding door to displace primarily in a longitudinal direction of the vehicle body from the intermediate position to an open position of the sliding door while the variable-length motion mechanism remains in the extended state.

14. The method according to claim 13, wherein the variable-length motion mechanism is a variable-length motion actuator, and wherein the step of performing the first motion sequence involves powered extension of the variable-length motion actuator from the contracted state to the extended state.

15. A fastening arrangement for fastening a vehicle sliding door to a vehicle body while enabling opening and closing of the sliding door, the fastening arrangement comprising:
 a motion element configured for being movingly arranged within or on a vehicle body guiding rail for enabling movement of the motion element along the vehicle body guiding rail,
 wherein the fastening arrangement further comprises a variable-length motion mechanism connected to the motion element and configured for being fastened to the sliding door at a lower attachment area of the sliding door, wherein the variable-length motion mechanism is configured for enabling variable distance between the motion element and the lower attachment area of the sliding door, wherein the variable-length motion mechanism includes an arm and a travel element, wherein the arm is pivotally connected to the motion element, wherein the travel element is secured to, and can travel along a length of the arm, and wherein the travel element is configured for being fastened to the sliding door at the lower attachment area of the sliding door for enabling variable distance between the motion element and the lower attachment area of the sliding door, and
wherein the variable-length motion mechanism is a rack-and-pinion actuator.

* * * * *